United States Patent
Yunoki et al.

(10) Patent No.: US 10,551,201 B2
(45) Date of Patent: Feb. 4, 2020

(54) MOVING BODY CONTROL METHOD, MOVING BODY, AND MOVING BODY CONTROL SYSTEM

(71) Applicant: Hitachi, Ltd., Tokyo (JP)

(72) Inventors: Shoji Yunoki, Tokyo (JP); Hideki Endo, Tokyo (JP); Hiroyuki Kubo, Tokyo (JP); Shouta Takagi, Tokyo (JP); Daisuke Mashimo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 15/753,978

(22) PCT Filed: Feb. 25, 2016

(86) PCT No.: PCT/JP2016/055574
§ 371 (c)(1),
(2) Date: Feb. 21, 2018

(87) PCT Pub. No.: WO2017/145314
PCT Pub. Date: Aug. 31, 2017

(65) Prior Publication Data
US 2018/0252539 A1    Sep. 6, 2018

(51) Int. Cl.
*G01C 21/34* (2006.01)
*B60W 30/08* (2012.01)
(Continued)

(52) U.S. Cl.
CPC ............. *G01C 21/34* (2013.01); *B60W 30/08* (2013.01); *B60W 30/10* (2013.01); *G05D 1/02* (2013.01)

(58) Field of Classification Search
CPC ....... G01C 21/34; B60W 30/08; B60W 30/10; G05D 1/02
See application file for complete search history.

(56) References Cited

U.S. PATENT DOCUMENTS

2014/0063232 A1* 3/2014 Fairfield .................. G06K 9/78
348/118
2014/0200801 A1 7/2014 Tsuruta et al.
(Continued)

FOREIGN PATENT DOCUMENTS

| JP | 2012-145998 A | 8/2012 |
| JP | 2012-243029 A | 12/2012 |
| JP | 2014-136480 A | 7/2014 |

OTHER PUBLICATIONS

International Search Report of PCT/JP2016/055574 dated May 17, 2016.

*Primary Examiner* — Sze-Hon Kong
(74) *Attorney, Agent, or Firm* — Mattingly & Malur, PC

(57) ABSTRACT

A moving body control method for a moving body includes detecting position information and generating a surrounding map of surroundings of the moving body from map information corresponding to the position information, acquiring sensor information from a sensor and detecting non-map information from the sensor information, determining whether the traveling route can be calculated by adding the non-map information to the surrounding map and applying to the surrounding map first restriction information in which restrictions in setting a traveling route, if the moving body can calculate the traveling route, the first restriction information is applied to the surrounding map to calculate the traveling route, if the moving body cannot calculate the traveling route, second restriction information that relaxes restrictions in setting the traveling route is applied to the first restriction information to calculate the traveling route and the calculated traveling route is outputted to the traveling control module.

14 Claims, 31 Drawing Sheets

(51) Int. Cl.
    *B60W 30/10*    (2006.01)
    *G05D 1/02*    (2006.01)

(56) References Cited

U.S. PATENT DOCUMENTS

| | | | |
|---|---|---|---|
| 2015/0254986 A1* | 9/2015 | Fairfield | G08G 1/22 |
| | | | 707/687 |
| 2016/0132705 A1* | 5/2016 | Kovarik | G06K 7/10376 |
| | | | 340/10.3 |
| 2016/0304028 A1* | 10/2016 | Hathaway | B60Q 9/008 |
| 2017/0122749 A1* | 5/2017 | Urano | G01C 21/30 |
| 2018/0151066 A1* | 5/2018 | Oba | G08G 1/096725 |
| 2019/0004513 A1* | 1/2019 | Chiba | B60T 7/22 |
| 2019/0039627 A1* | 2/2019 | Yamamoto | G08G 1/0962 |

* cited by examiner

161 AREA INFORMATION

| GPS COORDINATE RANGE | AREA NAME |
|---|---|
| 34.700-34.702° N<br>135.502-135.504° E | AREA A |
| 34.702-34.704° N<br>135.502-135.504° E | AREA B |
| ... | ... |

- CASE IN WHICH VEHICLE IS LOCATED AT 34.7001° N, 135.5021° E
- REFER TO MAP DATABASE AND READ MAP OF AREA A.

*FIG.4*

162 GENERAL INFORMATION

| ID | M1 | M2 | M3 | M4 | M5 | M6 | M7 |
|---|---|---|---|---|---|---|---|
| TYPE | ROAD | ROAD | SHOULDER | SHOULDER | BOUNDARY LINE (WHITE) | BOUNDARY LINE (ORANGE) | BOUNDARY LINE (WHITE) |
| STARTING CENTER POSITION (RELATIVE POSITION FROM REFERENCE POINT)[M] | EAST2.5 NORTH0 | EAST5.5 NORTH0 | EAST0.5 NORTH0 | EAST7.5 NORTH0 | EAST1.0 NORTH0 | EAST4.0 NORTH0 | EAST7.0 NORTH0 |
| ENDING CENTER POSITION (RELATIVE POSITION FROM REFERENCE POINT)[M] | EAST2.5 NORTH100 | EAST5.5 NORTH100 | EAST0.5 NORTH100 | EAST7.5 NORTH100 | EAST1.0 NORTH100 | EAST4.0 NORTH100 | EAST7.0 NORTH100 |
| WIDTH[M] | 3.0 | 3.0 | 1.0 | 1.0 | 0.15 | 0.15 | 0.15 |
| UPPER SPEED LIMIT[km/h] | 40 | 40 | 10 | 10 | - | - | - |

*FIG.5A*

| ID | M1 | M2 | M3 | M4 | M5 | M6 | M7 |
|---|---|---|---|---|---|---|---|
| TRAVELING DIRECTION | SOUTH TO NORTH | NORTH TO SOUTH | SOUTH TO NORTH | NORTH TO SOUTH | — | — | — |
| MAXIMUM TRAVELING WIDTH FROM ADJACENT BOUNDARY LINE[M] | — | — | 0.3 | 0.3 | — | — | — |
| CROSSABLE | — | — | — | — | YES | NO | YES |

163 NORMAL TRAVELING AREA RESTRICTION INFORMATION 1631, 1632, 1633, 1634

FIG.5B

164 RELAXED TRAVELING AREA RESTRICTION INFORMATION

| ID | M1 | M2 | M3 | M4 | M5 | M6 | M7 |
|---|---|---|---|---|---|---|---|
| TRAVELING DIRECTION | SOUTH TO NORTH, NORTH TO SOUTH | NORTH TO SOUTH, SOUTH TO NORTH | SOUTH TO NORTH, NORTH TO SOUTH | NORTH TO SOUTH, SOUTH TO NORTH | — | — | — |
| MAXIMUM TRAVELING WIDTH FROM ADJACENT BOUNDARY LINE[M] | — | — | 1.0 | 1.0 | — | — | — |
| CROSSABLE | — | — | — | — | YES | YES | YES |

215 OBJECT DETECTION INFORMATION

| ID | N1 | N2 | N3 | N4 | N5 | N6 |
|---|---|---|---|---|---|---|
| TYPE | PERSON | CONE | CONE | CONE | CONE | CONE |
| CENTER POSITION (POSITION FROM REFERENCE POINT) [M] | EAST2.5 NORTH15 | EAST2.5 NORTH16 | EAST3.75 NORTH16 | EAST3.75 NORTH17 | EAST3.75 NORTH18 | EAST2.5 NORTH18 |
| SIZE (WIDTH, DEPTH, HEIGHT)[M] | 0.6,0.5,1.7 | 0.5,0.5,0.8 | 0.5,0.5,0.8 | 0.5,0.5,0.8 | 0.5,0.5,0.8 | 0.5,0.5,0.8 |

*FIG.6A*

171 NORMAL OBJECT RESTRICTION INFORMATION

| ID | N1 | N2 | N3 | N4 | N5 | N6 |
|---|---|---|---|---|---|---|
| APPROACH PROHIBITION RANGE [M] | 1.0 | 1.0 | 1.0 | 1.0 | 1.0 | 1.0 |

*FIG.6B*

172 RELAXED OBJECT RESTRICTION INFORMATION

| ID | N1 | N2 | N3 | N4 | N5 | N6 |
|---|---|---|---|---|---|---|
| APPROACH PROHIBITION RANGE [M] | 0.5 | 0.5 | 0.5 | 0.5 | 0.5 | 0.5 |

*FIG.6C*

MOVING BODY CONTROL METHOD, MOVING BODY, AND MOVING BODY CONTROL SYSTEM

BACKGROUND

The present invention relates to a moving body that moves autonomously.

An autonomous traveling body that detects the surrounding environment with sensors such as a camera or radar and travels autonomously using GPS and map information is known. For example, JP 2012-145998 A discloses a technique whereby a travelable area is calculated on the basis of distance measurement data and a map, and a travel route is generated on the basis of the map in the travelable area and the direction of movement.

SUMMARY

In the above conventional example, the autonomous traveling body can perform autonomous travel if it correctly detects the surrounding environment using a sensor or the like, and if it can set a traveling route inside the travelable area. However, in the above conventional example, if the autonomous traveling body cannot correctly detect the surrounding state or the like, it cannot determine the traveling route and cannot continue autonomous travel. For example, in cases such as road construction, accidents, or disasters in which the autonomous traveling body cannot travel without crossing the center line, which it is prohibited from doing, then there was a problem that autonomous travel was rendered impossible since the autonomous travel body could not ignore restrictions such as traffic regulations in generating a travel route.

The present invention takes into consideration the above-mentioned problem, and an object thereof is to provide an autonomous travel body that can avoid a situation of being prevented from traveling due to road construction or the like.

A representative aspect of the present disclosure is as follows. A moving body control method for a moving body including a processor, a memory, and a traveling control module, the method comprising: a first step in which the moving body detects position information and generates a surrounding map of surroundings of the moving body from map information corresponding to the position information, a second step in which the moving body acquires sensor information from a sensor indicating a surrounding environment and detects non-map information from the sensor information, a third step in which the moving body determines whether the traveling route can be calculated by adding the non-map information to the surrounding map and applying to the surrounding map first restriction information in which restrictions in setting a traveling route are set in advance, a fourth step in which, if the moving body can calculate the traveling route, the first restriction information is applied to the surrounding map to calculate the traveling route, a fifth step in which, if the moving body cannot calculate the traveling route, second restriction information that relaxes restrictions in setting the traveling route is applied to the first restriction information to calculate the traveling route and a sixth step in which the calculated traveling route is outputted to the traveling control module.

According to the present invention, even when the road environment differs from usual due to road construction or the like, autonomous travel can be continued.

BRIEF DESCRIPTION OF THE DRAWINGS

FIG. 4 shows an example of the area information included in the map information according to the first embodiment of this invention.

FIG. 5A shows an example of the general information included in the map information according to the first embodiment of this invention.

FIG. 5B shows an example of the normal traveling area restriction information included in the map information according to the first embodiment of this invention.

FIG. 5C shows an example of the relaxed traveling area restriction information included in the map information according to the first embodiment of this invention.

FIG. 6A shows an example of the object detection information detected by the traveling route calculation module according to the first embodiment of this invention.

FIG. 6B shows an example of the normal object restriction information included in the object information according to the first embodiment of this invention.

FIG. 6C shows an example of the relaxed object restriction information included in the object information according to the first embodiment of this invention.

DETAILED DESCRIPTION OF EMBODIMENTS

Below, embodiments of the present invention will be explained with reference to affixed drawings.

Embodiment 1

Figure 1:
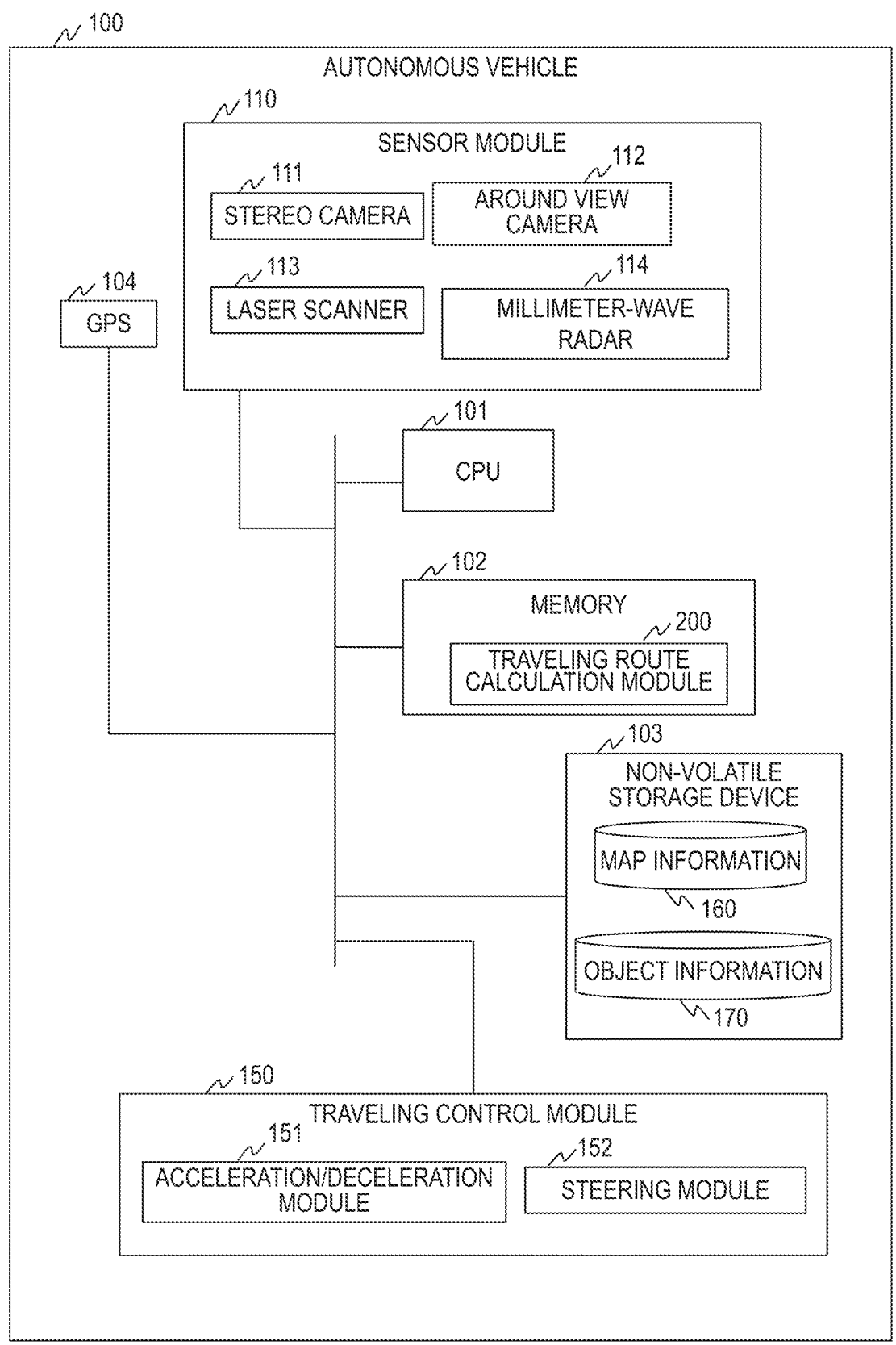
FIG. 1 is a block diagram showing an example of an autonomous vehicle according to a first embodiment of this invention

FIG. 1 is a block diagram showing an example of an autonomous vehicle 100. The autonomous vehicle 100 (vehicle) includes a sensor module 110 that detects the environment surrounding the vehicle, a GPS 104 (Global Positioning System) that detects the position information of the vehicle, a CPU 101 that performs computation, a memory 102 that stores programs and data, a non-volatile storage device 103 that stores maps and the like, and a traveling control module 150 that controls the vehicle.

The sensor module 110 includes a stereo camera 111 that monitors a prescribed direction using an image, an around view camera 112 that monitors the surroundings of the vehicle, a laser scanner 113 that detects objects in the vicinity of the vehicle and measures the distance therefrom, and a millimeter-wave radar 114 that detects an object in a prescribed direction and measures the distance therefrom. The types of sensors are not limited thereto, and as long as the sensors can detect objects or measure distances, publicly known or well-known sensors can be appropriately combined.

A traveling route calculation module 200 that generates a traveling route on the basis of the environment detected by the sensor module 110 and position information detected by the GPS 104 and issues commands to the traveling control module 150 regarding the traveling route and the target speed is loaded in the memory 102 and executed by the CPU 101. In the present embodiment, the traveling route calculation module 200 sets the speed limit of the traveling route as the target speed.

Map information 160 and object information 170 are stored in the non-volatile storage device 103, which is referenced by the traveling route calculation module 200. The object information 170 stores setting information of the traveling route for each type of detected object.

The traveling control module 150 includes an acceleration/deceleration module 151 that controls the power source and braking device to achieve the target speed, and a steering module 152 that controls the steering device according to the traveling route. A well-known or publicly-known technique can be used for the traveling control module 150.

<Software Configuration>

Figure 2:
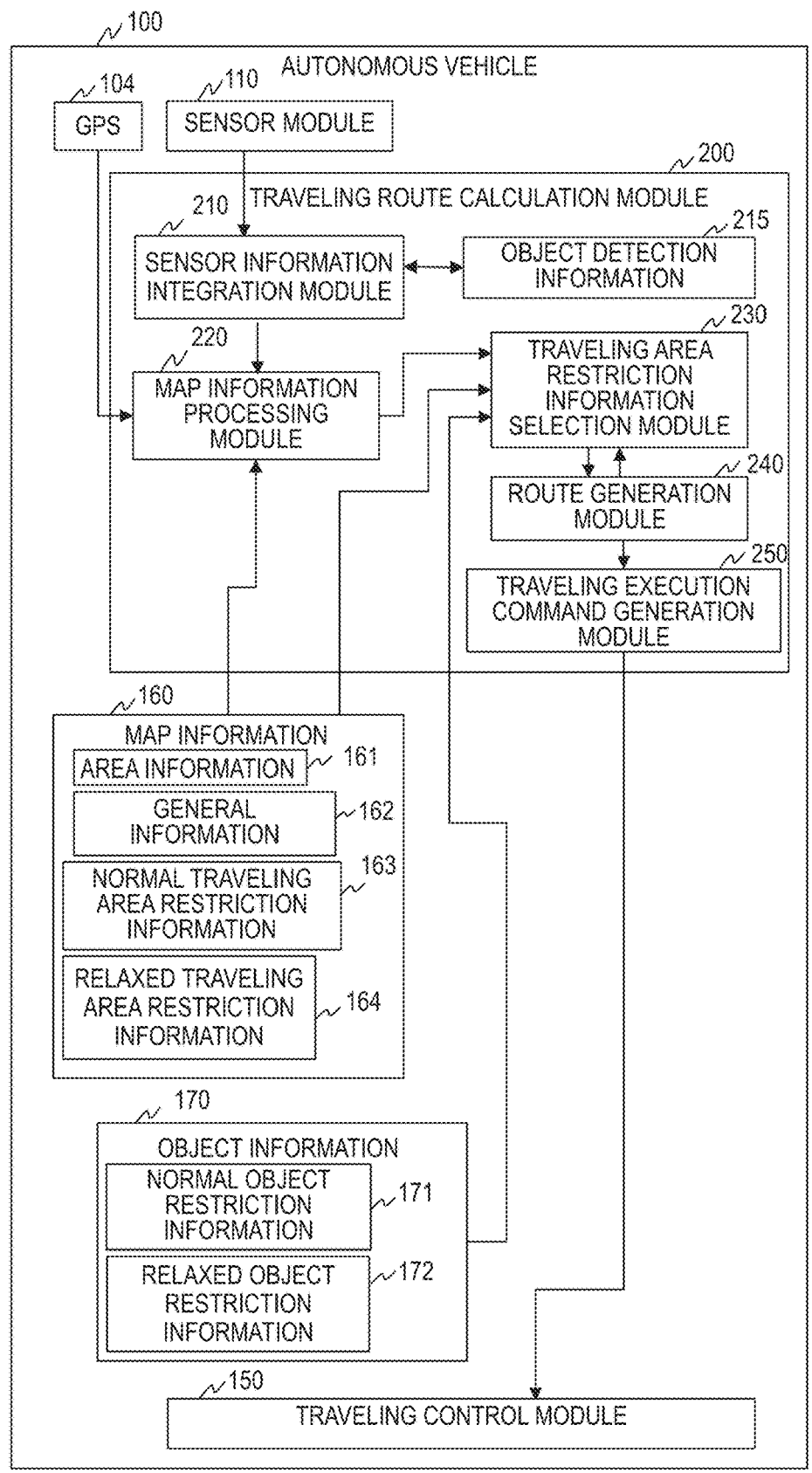
FIG. 2 is a block diagram of functional elements showing an example of the traveling route calculation module according to the first embodiment of this invention.

FIG. 2 is a block diagram of functional elements showing an example of the traveling route calculation module 200. The traveling route calculation module 200 includes: a sensor information integration module 210 that detects objects in the vicinity of the vehicle on the basis of the sensor information from the sensor module 110 and calculates the positions of the objects to calculate object detection information 215; a map information processing module 220 that generates a map surrounding the current position of the vehicle (hereinafter referred to as "surrounding map") on the basis of the position information from the GPS 104, the object detection information 215 from the sensor information integration module 210, and the map information 160; a traveling area restriction information selection module 230 that selects restriction information of the map information 160 and restriction information of the object information 170; a route generation module 240 that applies the restriction information selected by the traveling area restriction information selection module 230 to calculate the traveling route and the target speed; and a traveling execution command generation module 250 that issues as commands to the traveling control module 150 that traveling route and target speed outputted by the route generation module 240.

The sensor information integration module 210 acquires sensor information from the sensor module 110 and detects objects surrounding the vehicle, identifies the type of detected object, and calculates the relative position from the vehicle and the size of the object. Also, the sensor information integration module 210 stores the calculated object type, and the position and size of the object as the object detection information 215 (FIG. 6A) in a prescribed area of the memory 102.

A publicly-known or well-known technique may be used for the sensor information integration module 210 to identify the type and position of the object from image information and distance measurement information.

The map information processing module 220 refers to the map information 160 from the position information detected by the GPS 104 and identifies the traveling area in which the vehicle is traveling. The map information processing module 220 generates a surrounding map of the vehicle by acquiring general information indicating the shape of the road in the traveling area identified from the map information 160.

The surrounding map of the vehicle is a map in which information such as roads and buildings is drawn for a prescribed interval (10 m, 60 seconds, or the like, for example) from the reference position of the vehicle (the center of the front end of the vehicle, for example). The width direction (road width) of the surrounding map of the vehicle should at least include an area encompassing the travelable region and a traveling prohibition area. If the prescribed interval is set as a time, then the surrounding map is generated for a distance according to the speed of the autonomous vehicle 100. In other words, the map information processing module 220 generates as the surrounding map a map with a prescribed interval and a prescribed width.

The map information processing module 220 draws in the surrounding map objects of the object detection information 215 calculated by the sensor information integration module 210 and generates the surrounding map including the environment surrounding the vehicle.

The traveling area restriction information selection module 230 first selects normal traveling area restriction information (FIG. 5B) of the map information 160 and normal object restriction information (FIG. 6B) of the object information 170, and outputs these to the route generation module 240.

The route generation module 240 identifies the travelable area and traveling prohibition area from the surrounding map generated by the map information processing module 220 and the normal restriction information (normal traveling area restriction information and normal object restriction information) selected by the traveling area restriction information selection module 230. The travelable area includes the normal travelable area and the relaxed travelable area.

The route generation module 240 sets the target location in the travelable area as will be described later, and calculates as provisional coordinates the location through which the vehicle would pass from the current position to the target location. Below, the normal traveling area restriction information and the normal object restriction information are set as the normal restriction information.

The route generation module 240 calculates provisional coordinates at a prescribed interval from the current position to the target location in the surrounding map and sets the lines connecting the provisional coordinates as the traveling route. The prescribed interval is a value set in advance according to distance or time (distance according to vehicle speed).

If the route generation module 240 can set a traveling route to the target location, it reads in the speed limit from the map information 160 and sets this as the target speed, and outputs the traveling route and target speed to the traveling execution command generation module 250.

The traveling execution command generation module 250 generates a command pertaining to acceleration/deceleration according to the current traveling state, the traveling route, and the target speed, and a command pertaining to steering, and outputs these commands to the traveling control module 150. The traveling control module 150 controls the autonomous vehicle 100 on the basis of the received commands.

On the other hand, if there is an obstacle on the road due to road construction, a disaster, an accident, or the like and the route generation module 240 cannot set a traveling route to the target location, then the traveling area restriction information selection module 230 sequentially selects relaxed restriction information in which normal restriction information is relaxed, and outputs this to the route generation module 240. In other words, the traveling area restriction information selection module 230 sequentially selects elements of the relaxed traveling area restriction information (FIG. 5C) and elements of the relaxed object restriction information (FIG. 6C), applies these to the normal traveling area restriction information (FIG. 5B) and the normal object restriction information (FIG. 6B) and outputs these to the route generation module 240.

The route generation module 240 once again calculates the traveling route using new restriction information (normal traveling area restriction information and normal object restriction information) where some (or all) of the restrictions have been lifted. Below, the relaxed traveling area restriction information and the relaxed object restriction information are set as the relaxed restriction information.

Also, if the route generation module 240 cannot set a traveling route to the target location, then it once again issues a request to the traveling area restriction information selection module 230 to relax restriction information and recalculates a traveling route from new normal restriction information.

In the present embodiment, an example is described in which if there is an obstacle on a road on the surrounding map, the traveling area restriction information selection module 230 selects relaxed restriction information in stages (partially or sequentially) and applies this to normal restriction information to ease restrictions, but the configuration is not limited to this example, and relaxed restriction information in which all normal restriction information is removed may be used.

The functions of the traveling route calculation module 200 are loaded in the memory 102 as programs. The CPU 101 operates as functional units that provide prescribed functions by executing processes according to programs in respective functional units. For example, the CPU 101 functions as the traveling route calculation unit 200 by executing a process according to a traveling route calculation program. The same applies for other programs. Additionally, the CPU 101 also operates as functional units providing, respectively, functions of a plurality of processes executed by respective programs. The computer and the computer system are a device and system including these functional units.

Programs, tables, and the like realizing respective functions of the traveling route calculation module 200 can be stored in a storage device such as the non-volatile storage device 103, a non-volatile semiconductor memory, a hard disk drive, or a solid state drive (SSD), or in a computer-readable non-transitory data storage medium such as an IC card, an SD card, or a DVD.

Next, the map information 160 stored in the non-volatile storage device 103 includes area information 161 for identifying the traveling area, general information 162 for storing information of roads for each traveling area, normal traveling area restriction information 163 in which normal road restriction information is stored, and relaxed traveling area restriction information 164 in which relaxed road restriction information is stored.

The restriction information of the road has set in advance a travelable or traveling prohibition region and boundaries when setting the traveling route.

Also, the object information 170 includes normal object restriction information 171 that stores restriction information pertaining to objects under normal circumstances, and relaxed object restriction information 172 that stores restriction information pertaining to objects during when restrictions are being relaxed.

The restriction information pertaining to objects has set therein restrictions such as the distance to which the autonomous vehicle 100 can approach, the speed, and the like when setting the traveling route.

<Surrounding Map>

Figure 3:
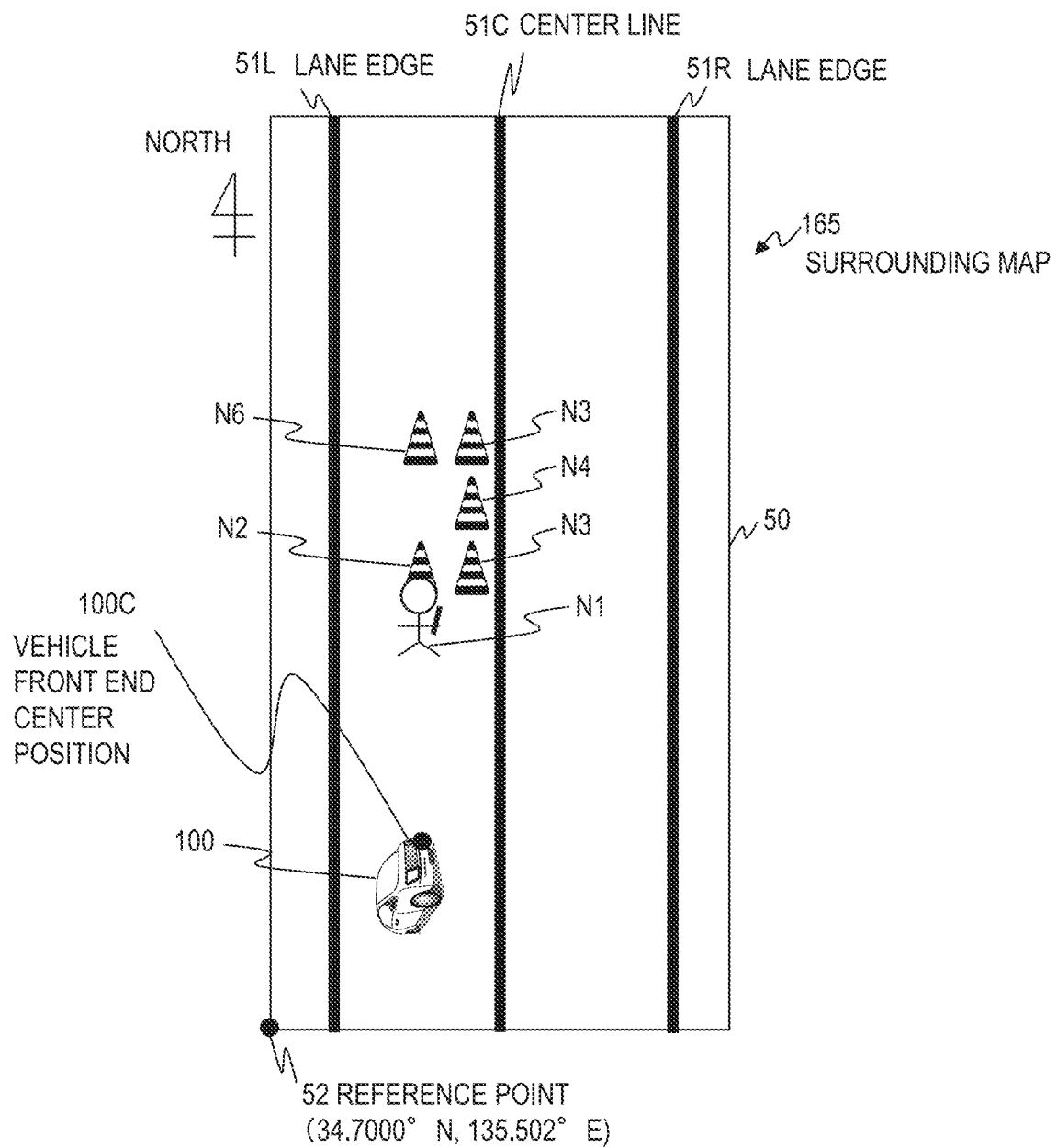
FIG. 3 is a surrounding map showing one example of a road under construction according to the first embodiment of this invention.

FIG. 3 is a surrounding map 165 showing one example of a road under construction. The depicted road 50 is an example of a road with left-hand traffic. In the example shown, the road 50 is shown from a reference point 52 corresponding to the traveling area where the autonomous vehicle 100 is traveling to a prescribed interval, and is comprised of a single lane on one side extending in the north/south direction. The traveling area indicates a partial region where the vehicle is traveling within the map information 160, and in the present embodiment, indicates a region of the surrounding map 165.

The center of the road 50 has a center line 51C that vehicles are not allowed to stray across, and lane edges 51L and 51R are set as boundary lines on the boundary between the shoulder and the traveling lane. Construction is being done on the traveling lane where the autonomous vehicle 100 is traveling, and a person N1 and cones N2 to N6 (or pylons) are located in the traveling lane.

The reference point 52 on the surrounding map 165 is set in advance for each traveling area in which the autonomous vehicle 100 is traveling, and has coordinates including latitude and longitude. The coordinates of the reference point 52 are not shown in the drawing but can be included in the area information 161. Also, an example is shown in which the traveling route of the autonomous vehicle 100 is set with reference to a vehicle front end center position 100C.

<Map Information and Object Information>

FIGS. 4 to 5C show details of the map information 160 and show area information 161, general information 162, normal traveling area restriction information 163, and relaxed traveling area restriction information 164.

FIG. 4 shows an example of the area information 161 included in the map information 160. The area information 161 includes in one entry a GPS coordinate range 1611 that stores the range of position information detected by the GPS 104, and an area name 1612 that stores an identifier of the traveling area that is a portion of the map information 160.

The GPS coordinate range 1611 has set in advance therein a latitude range and a longitude range for each traveling area. The area name 1612 is used by the traveling route calculation module 200 as a readable module of the map (general information) of a traveling area included in the map information 160.

In the example shown, if the position information of the GPS 104 is 34.700 to 31.702° N and 135.50 to 135.504° E, then the traveling route calculation module 200 reads in a map of an area A. Also, the area information 161 stores the coordinates of the reference point 52 for each area name 1612.

FIG. 5A shows an example of the general information 162 included in the map information 160. In the example shown, the general information 162 of the area A is shown in the area information 161.

The general information 162 stores in one entry an ID 1621 that stores an identifier of a constituent element of the map, a type 1622 that stores the type of the constituent element of the map, a starting center position 1623 that stores the center position of the starting point of the constituent element (relative position from reference point 52), an ending center position 1624 that stores the center position of the ending point of the constituent element (relative position from reference point 52), a width 1625 of the constituent element, and an upper speed limit 1626 that stores the speed limit set for the constituent element.

FIG. 5B shows an example of the normal traveling area restriction information 163 included in the map information 160. In the example shown, the normal traveling area restriction information 163 of the area A is shown in the area information 161.

The normal traveling area restriction information 163 includes in one entry an ID 1631 that stores an identifier of a constituent element of the map, a traveling direction 1632 that stores the direction of travel at the component element of the map, a maximum traveling width 1633 from an adjacent boundary that stores the distance from which the vehicle should be separated from the constituent element and an adjacent boundary line, and crossable information 1634 that sets whether or not the constituent element (boundary line) may be crossed.

The traveling direction 1632 stores the direction of travel on the constituent element of the map. The maximum traveling width 1633 stores the distance to which the vehicle may approach the adjacent boundary. The crossable information 1634 is set to "yes" if the vehicle can travel while crossing the constituent element (boundary line) and "no" if the vehicle cannot travel while crossing the constituent element.

In the normal traveling area restriction information 163, restrictions pertaining to travel when there is no obstacle on the road are set for each constituent element on the map.

FIG. 5C shows an example of the relaxed traveling area restriction information 164 included in the map information 160. In the example shown, the relaxed traveling area restriction information 164 of the area A is shown in the area information 161.

The relaxed traveling area restriction information 164 includes in one entry an ID 1641 that stores an identifier of a constituent element of the map, a traveling direction 1642 that stores the direction of travel at the constituent element of the map, a maximum traveling width 1643 from an adjacent boundary that stores the distance from which the vehicle should be separated from the constituent element and an adjacent boundary line, and crossable information 1644 that sets whether or not the boundary line may be crossed.

The traveling direction 1642 stores the direction of travel on the constituent element of the map. The maximum traveling width 1643 stores the distance to which the vehicle may approach the adjacent boundary. The crossable information 1644 is set to "yes" if the vehicle can travel while crossing the constituent element (boundary line) and "no" if the vehicle cannot travel while crossing the constituent element.

In the relaxed traveling area restriction information 164, restrictions that are relaxed compared to the normal traveling area restriction information 163 when there is an obstacle on the road are set for each constituent element on the map.

Figure 5D:
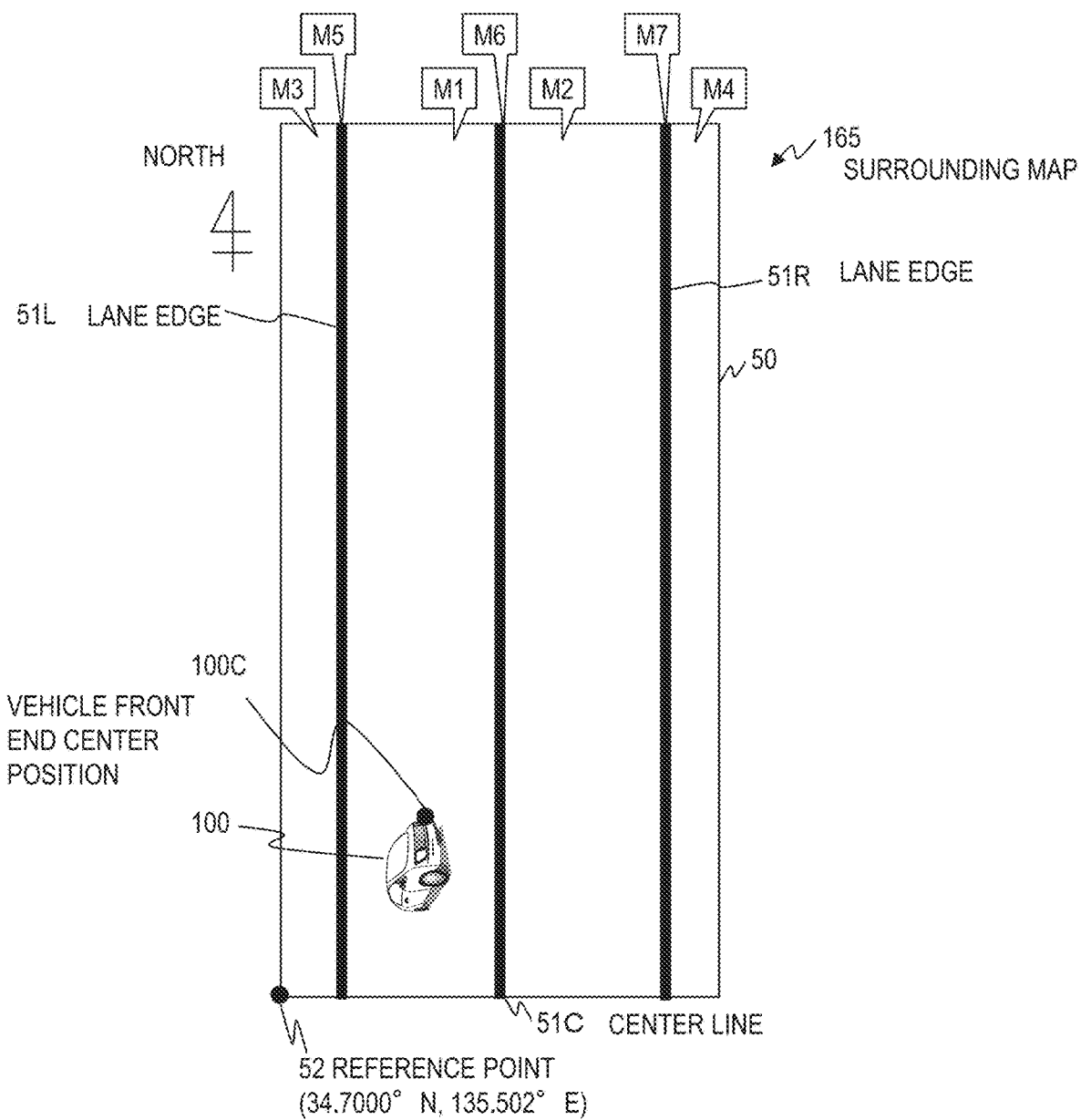
FIG. 5D is an example of the surrounding map generated by the traveling route calculation module from the general information of the map information according to the first embodiment of this invention.

FIG. 5D is an example of the surrounding map 165 generated by the traveling route calculation module 200 from the general information 162 of the map information 160. The map information processing module 220 of the traveling route calculation module 200 sets the center line 51C of the road 50 as a boundary line M6 from the general information 162 of the map information 160 of the area A, sets the lane edges 51L and 51R as boundary lines M5 and M7, sets the region on which the autonomous vehicle 100 is traveling as a road M1, sets the oncoming lane as a road M2, sets the area outside of the boundary line M5 as a shoulder M3, and sets the area outside of the boundary line M7 as a shoulder M4.

Each region on the road 50 has set therein an upper speed limit 1626 in the general information 162, and thus, if the traveling route is set, then the upper speed limit can be set as the target speed of the autonomous vehicle 100.

FIG. 6A shows an example of the object detection information 215 detected by the traveling route calculation module 200.

The object detection information 215 includes in one entry an ID 2151 that stores an identifier of an object, a type 2152 that stores a type of object, a center position 2153 that stores a relative position of the object, and a size 2154 of the object.

The center position 2153 is comprised of a distance and orientation from the vehicle front end center position 100C of the autonomous vehicle 100 to the center of the object. The size 2154 has stored therein dimensions in the order of width, depth, and height.

FIG. 6B shows an example of the normal object restriction information 171 included in the object information 170. The normal object restriction information 171 is set in advance according to the object type. The normal object restriction information 171 includes in one entry an ID 1711 that stores an identifier of the object, and an approach prohibition range 1712 that stores a range over which the autonomous vehicle 100 is not allowed to approach the object. The approach prohibition range 1712 has set therein a distance to which the autonomous vehicle 100 cannot approach, with the side face of the object as the point of origin.

In the normal object restriction information 171, restrictions pertaining to the object when there is no obstacle on the road are set for each object element.

FIG. 6C shows an example of the relaxed object restriction information 172 included in the object information 170. The relaxed object restriction information 172 is set in advance according to the object type.

The relaxed object restriction information 172 includes in one entry an ID 1721 that stores an identifier of the object, and an approach prohibition range 1722 that stores a range over which the autonomous vehicle 100 is not allowed to approach the object.

In the relaxed object restriction information 172, restrictions that are relaxed compared to the normal object restriction information 171 when there is an obstacle on the road are set for each object element.

Figure 6D:
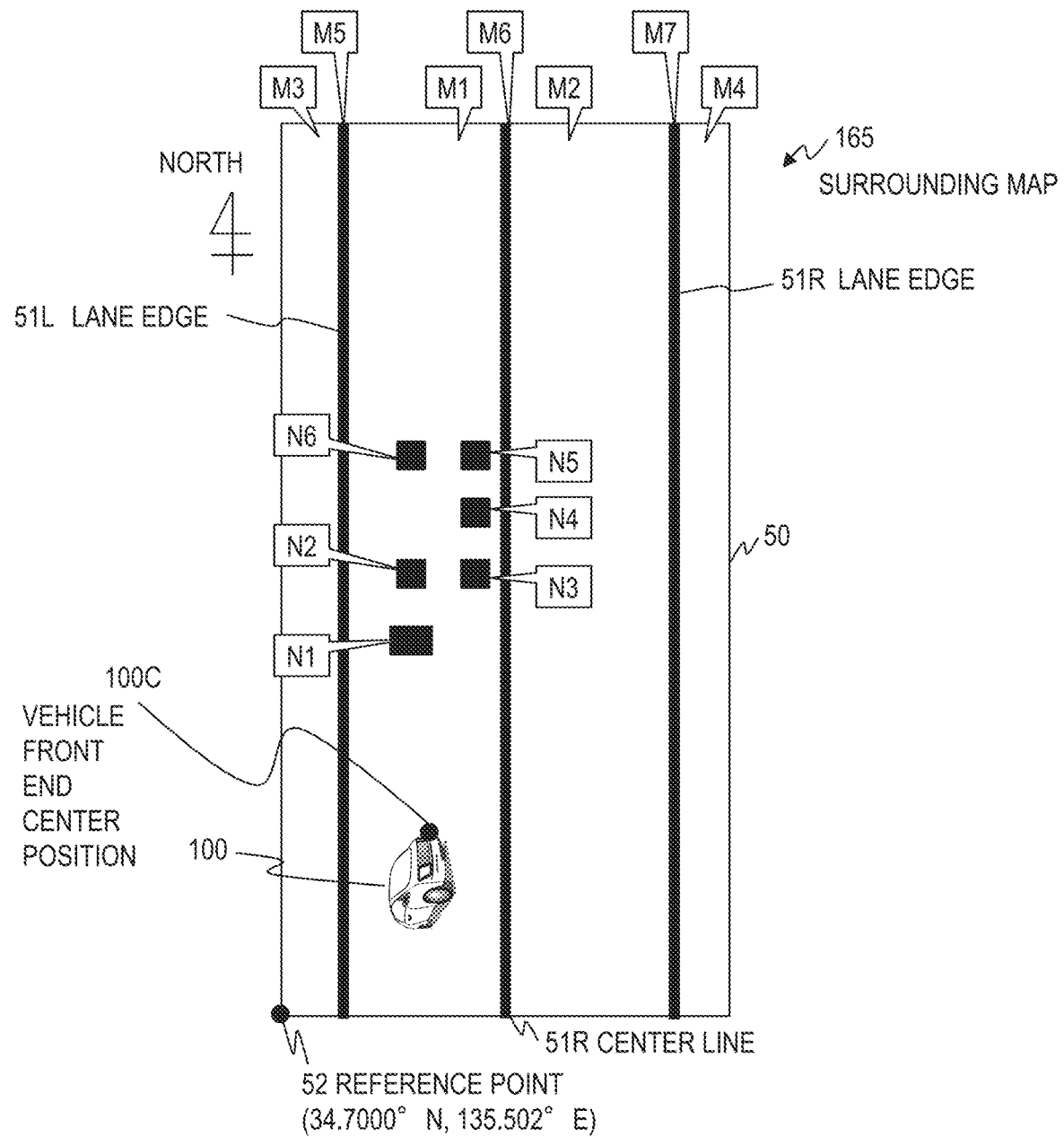
FIG. 6D is a map created by the map information processing module of the traveling route calculation module adding the object detection information according to the first embodiment of this invention.

FIG. 6D is a map created by the map information processing module 220 of the traveling route calculation module 200 adding the object detection information 215 generated by the sensor information integration module 210 to the surrounding map 165.

An example is shown in which the map information processing module 220 of the traveling route calculation module 200 has added each element of the object detection information 215 generated by the sensor information integration module 210 to the surrounding map 165.

The traveling route calculation module 200 adds objects to the surrounding map 165 on the basis of the relative distance and orientation from the vehicle front end center position 100C to the center of the object. In the example shown, the road 50 is such that the person N1 and the cones N2 to N6 are added to the road M1 to the front of the autonomous vehicle 100 shown in FIG. 3.

<Traveling Route Generating Process>

Figure 7:
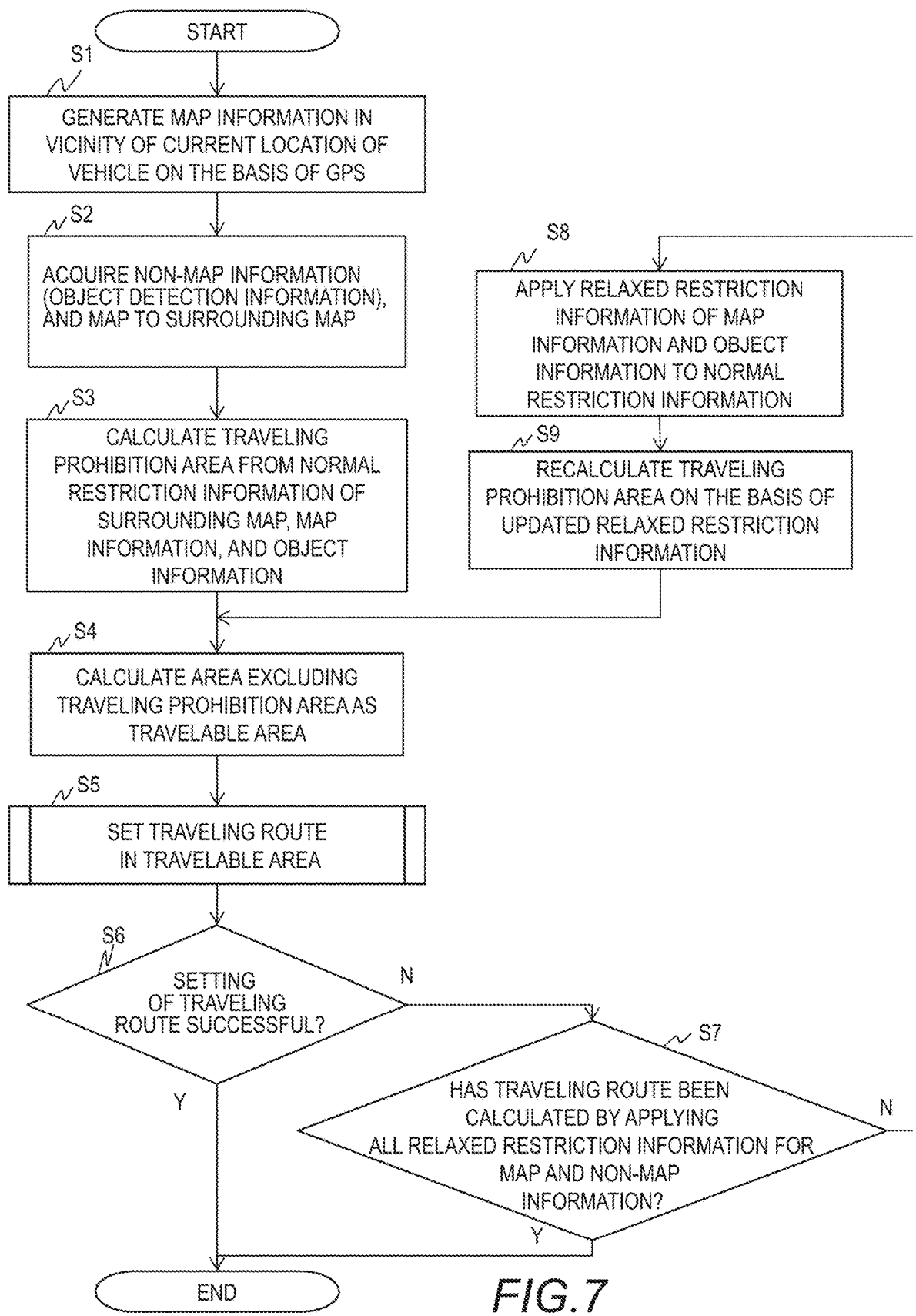
FIG. 7 is a flowchart showing an example of the process performed in the traveling route calculation module according to the first embodiment of this invention.

FIG. 7 is a flowchart showing an example of the process performed in the traveling route calculation module 200. The process is executed at a prescribed timing. First, in step S1, the traveling route calculation module 200 acquires the general information 162 from the map information 160 on the basis of the position information acquired from the GPS 104 and generates the surrounding map 165 of the traveling area in which the vehicle is traveling.

In this process, the map information processing module 220 refers to the area information 161 of the map information 160 from the position information detected by the GPS 104 and identifies the traveling area (area information 1612) in which the vehicle is traveling. The map information processing module 220 generates the surrounding map 165 of the vehicle from the reference point of the travelable area to a prescribed interval by acquiring the general information 162 indicating the shape of the road in the traveling area identified from the area information 161.

In step S2, the traveling route calculation module 200 detects objects on the basis of the sensor information acquired from the sensor module 110 and adds the objects to the surrounding map 165.

As described above, in this process, the sensor information integration module 210 acquires sensor information from the sensor module 110 and detects objects surrounding the vehicle, identifies the type of detected object, calculates the relative position from the vehicle and the size as the object detection information 215 (non-map information), and causes these objects to be drawn by the map information processing module 220. The sensor information integration module 210 is not limited to detecting objects in the vicinity of the vehicle, and may also detect environment information in the vicinity of the vehicle such as road conditions and weather as non-map information.

Next, in step S3, the traveling route calculation module 200 calculates the traveling prohibition area of the surrounding map 165 on the basis of the surrounding map 165, the normal restriction information (normal traveling area restriction information 163 and normal object restriction information 171), and the direction of travel of the vehicle, and sets the traveling prohibition area in the surrounding map 165.

In step S4, the traveling route calculation module 200 sets a region excluding the traveling prohibition area set in the surrounding map 165 as the travelable area in the surrounding map 165. As a result, the traveling area where the vehicle is traveling is set as the surrounding map 165 shown in FIG. 9A.

Figure 9A:
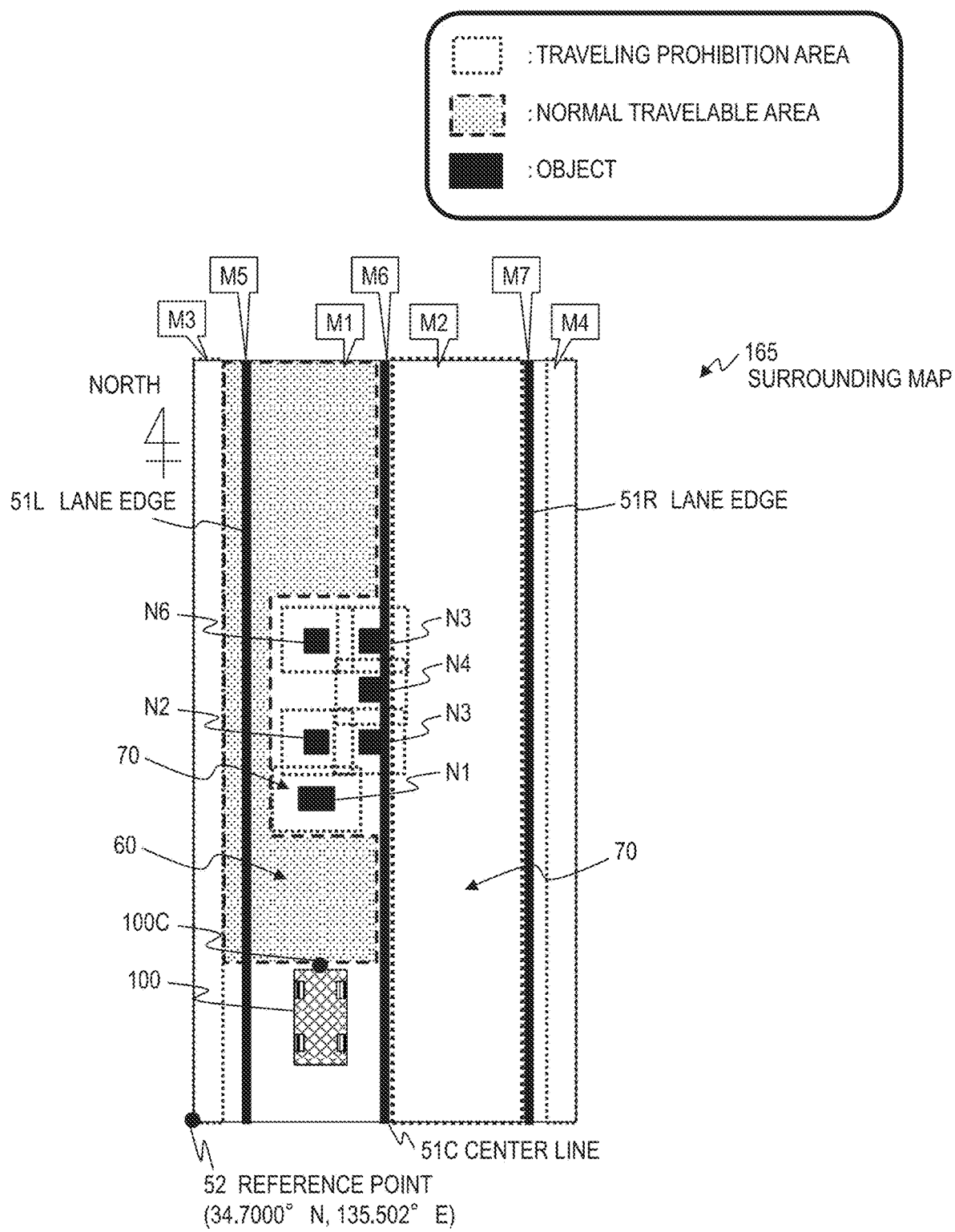
FIG. 9A is a map showing one example of a traveling area calculated by the traveling route calculation module by applying the normal restriction information according to the first embodiment of this invention.

FIG. 9A is a map showing one example of a traveling area calculated by the traveling route calculation module 200 by applying the normal restriction information (first restriction information). In FIG. 9A, the road M1 from the center line 51C (M6) to the lane edge 51L, and a portion of the left shoulder M3 of the lane edge 51L are set as the normal travelable area 60, and a region aside from that is set as the traveling prohibition area 70.

In the example shown, the normal travelable area 60 is set in a portion of the shoulder M3 as well. This is because the maximum traveling width 1633 from the adjacent boundary of the normal traveling area restriction information 163 is set to "0.3M", and thus, travel is possible in up to "0.3M" of the area to the left of the lane edge 51L.

Also, the person N1 and the cones N2 to N6 on the road M1 have set therefor the traveling prohibition area 70, which was set by adding the approach prohibition range 1712 of the normal object restriction information 171 of FIG. 6B to the size 2154 of the object detection information 215 of FIG. 6A.

Next, in step S5, the route generation module 240 of the traveling route calculation module 200 calculates the traveling route in the traveling area and sets provisional coordinates on the surrounding map 165. This process is shown in detail in FIG. 8.

In step S6, the traveling route calculation module 200 determines whether or not setting of the traveling route in the travelable area has succeeded. Setting of the traveling route is determined to have succeeded if provisional coordinates have been set from the current location to the target location (described below) set in the travelable area, and otherwise is determined to have failed. If setting of the traveling route is determined to have succeeded, then the process ends, and if setting of the traveling route is determined to have failed, then the process progresses to step S7.

In step S7, the traveling route calculation module 200 determines whether traveling route calculation has been performed by applying all relaxed restriction information (relaxed traveling area restriction information 164 and relaxed object restriction information 172) to the normal restriction information.

In steps S7 to S9, an example is shown in which the traveling area restriction information selection module 230 of the traveling route calculation module 200 selects the relaxed restriction information (second restriction information) in stages, applies the relaxed restriction information to the normal restriction information, and recalculates the traveling route. In step S8, the traveling route calculation module 200 selects elements of the relaxed traveling area restriction information 164 and applies these to the normal traveling area restriction information 163, and selects elements of the relaxed object restriction information 172 and applies these to the normal object restriction information 171.

The traveling area restriction information selection module 230 selects the relaxed restriction information of the region in which the vehicle is currently traveling and applies this to the normal restriction information, and in the following iteration selects the relaxed restriction information of the region adjacent to the region where the vehicle is currently traveling in applies this to the normal restriction information, for example.

In this example, the vehicle is traveling on the road M1, and thus, the traveling area restriction information selection module 230 first selects restriction information for the ID 1641 of "M1" in the relaxed traveling area restriction information 164, and applies this to the normal traveling area restriction information 163. For the ID 1631 of "M1" in the normal traveling area restriction information 163, the traveling direction is both "south to north" and "north to south", but the area under construction cannot be avoided.

Next, the traveling area restriction information selection module 230 selects the relaxed traveling area restriction information 164 of the boundary line M6 adjacent to the road M1 where the vehicle is currently traveling, and applies this to the normal traveling area restriction information 163. For the ID 1631 of "M6" in the normal traveling area restriction information 163, the crossable information 1634 is changed from "no" to "yes". However, since the road M2 in the oncoming lane is a traveling prohibition area 70, the construction area cannot be avoided.

Next, the traveling area restriction information selection module 230 selects the relaxed traveling area restriction information 164 of the road M2 adjacent to the previously selected boundary line M6, and applies this to the normal traveling area restriction information 163. For the ID 1631 of "M2" in the normal traveling area restriction information 163, the traveling direction is both "north to south" and "south to north". As a result, the vehicle can cross the center line 51C and travel on the road M2, which is the oncoming lane, and avoid the construction area.

The order in which the traveling area restriction information selection module 230 selects elements of the relaxed traveling area restriction information 164 is not limited to sequential selection from elements adjacent to the current traveling area, and a publicly-known or well-known method such as round-robin or random ordering may be used.

For the object restriction information 171 as well, the traveling area restriction information selection module 230 may similarly select elements of the relaxed object restriction information 172 sequentially, and applies these to the normal object restriction information 171.

In step S9, the traveling route calculation module 200 recalculates the traveling prohibition area 70 using the normal restriction information that was relaxed in step S8.

By the above process, the traveling route calculation module 200 outputs the traveling route calculation results in the travelable area to the traveling control module 150. If there is an obstacle in the vehicle traveling area, the traveling route calculation module 200 applies the relaxed restriction information to the normal restriction information to search for a route that avoids the obstacle. Also, by the traveling route calculation module 200 selecting the relaxed restriction information in stages and applying this to the normal restriction information, it is possible to calculate an optimal traveling route while adhering to restrictions set for the road 50.

Figure 9B:
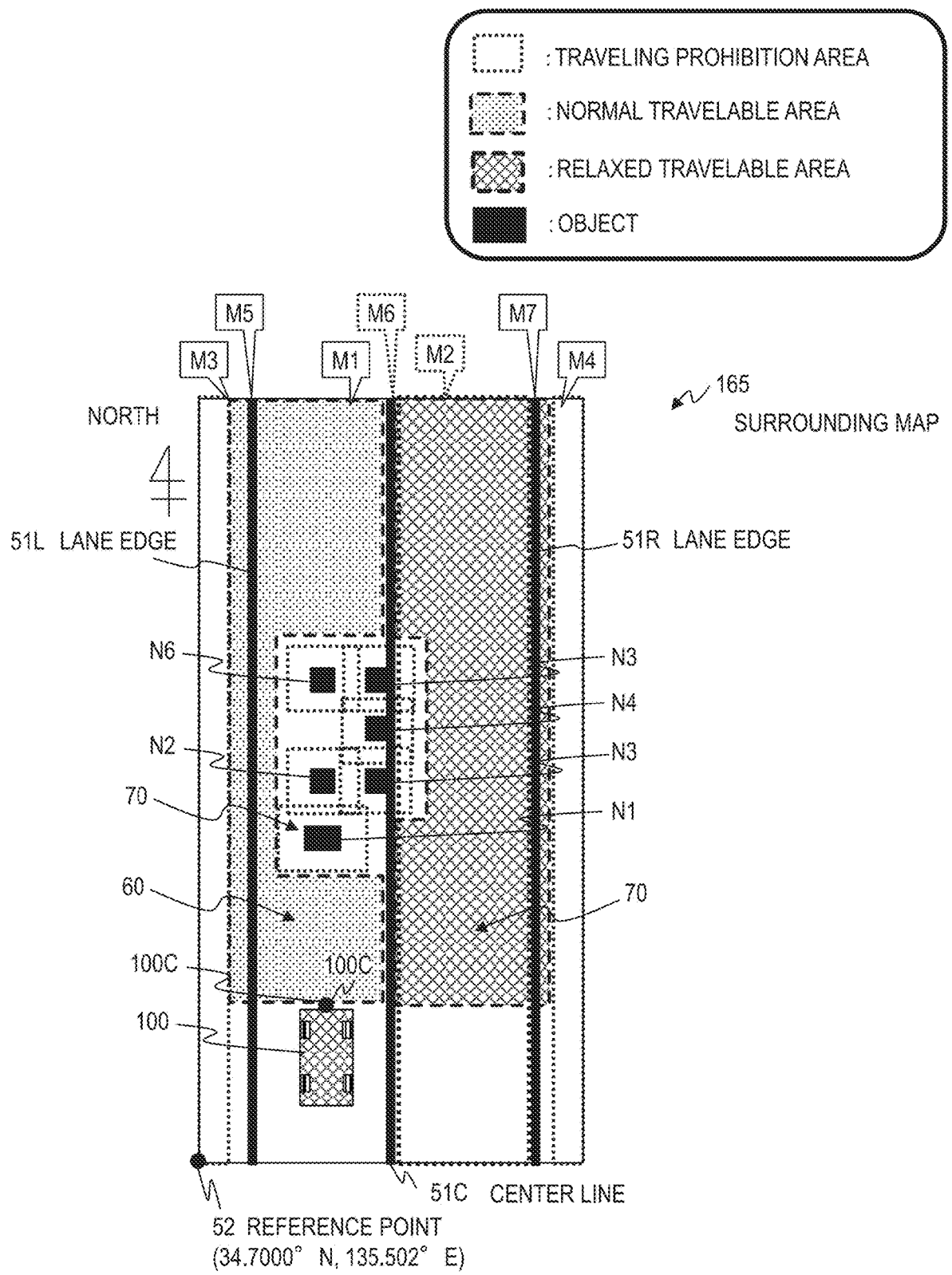
FIG. 9B is a map showing one example of a traveling area calculated by the traveling route calculation module by applying the normal restriction information to the relaxed restriction information according to the first embodiment of this invention.

FIG. 9B is a map showing one example of a traveling area calculated by the traveling route calculation module 200 by applying the normal restriction information to the relaxed restriction information. The traveling area of FIG. 9B has been set such that in addition to the normal travelable area 60 of FIG. 9A, the traveling route calculation module 200 has modified a portion of the traveling prohibition area 70 of the road M2, which is the oncoming lane, to a relaxed travelable area 65.

If the traveling route calculation module 200 cannot generate a traveling route to a target location Pg in the normal travelable area 60, the traveling route calculation module applies the relaxed restriction information to the normal restriction information, which expands the region where the vehicle can travel.

In the process of steps S7 to S9, when the traveling route calculation module 200 fails to set the traveling route, the traveling area restriction information selection module 230 applies the relaxed restriction information to the normal restriction information as described above, and expands the travelable area of the autonomous vehicle 100.

In the example of FIG. 9B, the traveling area restriction information selection module 230 first selects crossable information 1644="yes" for restrictions pertaining to the center line 51C with the ID 1641 of "M6" in the relaxed traveling area restriction information 164, and applies this to the ID 1631 of "M6" in the normal traveling area restriction information 163 of FIG. 5B. As a result, the vehicle front end center position 100C can cross the center line 51C (boundary line M6).

Next, the traveling area restriction information selection module 230 selects traveling direction 1642="north to south, south to north" for the opposing lane road with the ID 1641 of "M2" in the relaxed traveling area restriction information 164, and applies this to the ID 1631 of "M6" in the normal traveling area restriction information 163 of FIG. 5B. As a result, the vehicle front end center position 100C can travel in the road M2, which is across the center line 51C (boundary line M6).

For the road M2, which was the traveling prohibition area 70, the traveling route calculation module 200 sets the area from the vehicle front end center position 100C to the target location Pg as the relaxed travelable area 65 where the vehicle can travel. The relaxed travelable area 65 typically indicates that an area in which the vehicle cannot normally travel is temporarily set to be a travelable area.

Figure 8:
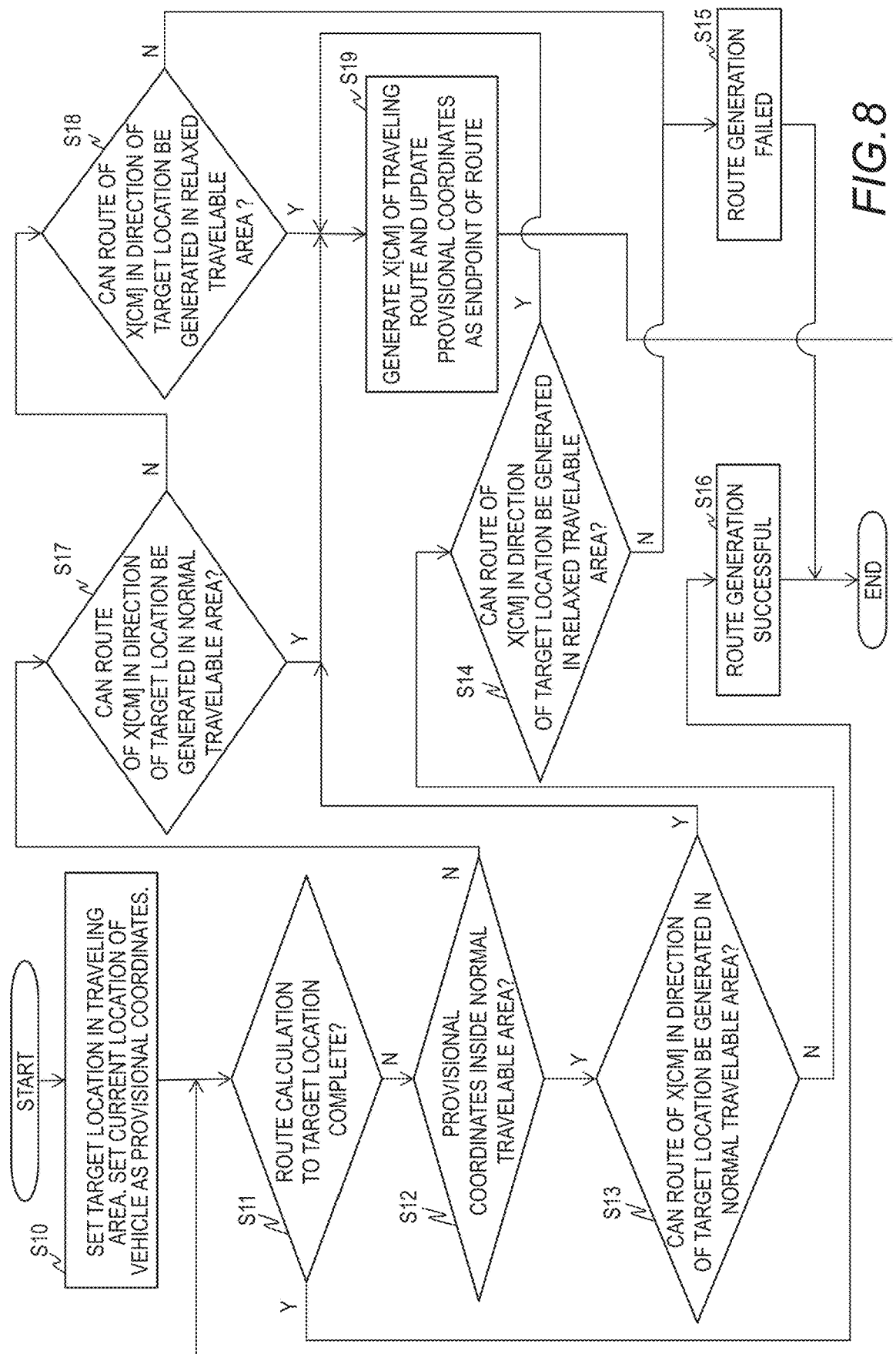
FIG. 8 is a flowchart showing an example of the process of the route generation module performed in step S5 of FIG. 7 by the traveling route calculation module according to the first embodiment of this invention.

FIG. 8 is a flowchart showing an example of the process of the route generation module 240 performed in step S5 of FIG. 7 by the traveling route calculation module 200. In step S10, the traveling route calculation module 200 sets a target location Pg for which to generate the traveling route in a prescribed location in the traveling area. The traveling route calculation module 200 sets the vehicle front end center position 100C that is the current position of the vehicle as the starting point (point of origin) for the provisional coordinates Pn generated as the traveling route. "n" is a natural number.

The target location Pg is set as a coordinate that is in the same region as the region where the vehicle is currently traveling (road M1), and that the vehicle is set to pass after traveling a prescribed distance (100 m, for example) or after a prescribed time (10 seconds, etc.), for example. The coordinates in the road width direction of the target location Pg may be set to the center of the region in which the vehicle is traveling.

The target location Pg in the traveling area is set to be on the road M1 on which the vehicle is currently traveling, but if the region set for the target location Pg is a traveling prohibition area, then as described with steps S7 and S8 of FIG. 7, the relaxed restriction information may be selected in stages and applied to the normal restriction information to set the target location Pg.

Next, in step S11, the traveling route calculation module 200 determines whether the generated provisional coordinates Pn have reached the target location Pg. If the generated provisional coordinates Pn are closer to the side of the vehicle front end center position 100C than the target location Pg, then the traveling route calculation module 200 determines that the calculation of the provisional coordinates Pn to the target location Pg has not been completed, and progresses to step S12.

On the other hand, if the provisional coordinates Pn generated next have reached the target location Pg, then the traveling route calculation module 200 determines that the calculation of the provisional coordinates Pn to the target location Pg has been completed, progresses to step S16, determines that the traveling route has been completed up to the target location Pg, and ends the process.

In step S12, the traveling route calculation module 200 determines whether the calculated provisional coordinates Pn are inside the normal travelable area 60. If the calculated provisional coordinates Pn are inside the normal travelable area, then the process progresses to step S13, and if not, the process progresses to step S17.

In step S13, the traveling route calculation module 200 determines whether the next provisional coordinates Pn+1 can be generated in the normal travelable area 60 that is shifted towards the target location Pg by a prescribed distance of Xcm (or a prescribed time of Y seconds). If the next provisional coordinates Pn+1 attained by adding the prescribed distance of Xcm to the current provisional coordinates Pn can be set in the normal travelable area 60, then the traveling route calculation module 200 progresses to step S19, and if not, progresses to step S14.

In step S14, the traveling route calculation module 200 uses the relaxed travelable area 65 instead of the normal travelable area 60 to determine whether the next provisional coordinates Pn+1 can be generated in the position that is shifted towards the target location Pg by a prescribed distance of Xcm (or a prescribed time of Y seconds).

If the next provisional coordinates Pn+1 can be generated in the relaxed travelable area 65, then the traveling route calculation module 200 progresses to step S19, and if not, progresses to step S15. In step S15, it is determined that the traveling route calculation module 200 has failed to generate the traveling route and the process ends.

Next, in step S7 where the provisional coordinates Pn were determined in step S12 not to be in the normal travelable area 60, the traveling route calculation module 200 determines whether the next provisional coordinates Pn+1 can be generated in the normal travelable area 60 that is shifted towards the target location Pg by a prescribed distance of Xcm (or a prescribed time of Y seconds).

If the next provisional coordinates Pn+1 can be generated in the normal travelable area 60, then the traveling route calculation module 200 progresses to step S19, and if not, progresses to step S18.

Next, in step S18 where it was determined in step S17 that the provisional coordinates Pn+1 could not be set in the normal travelable area 60, the traveling route calculation module 200 determines whether the next provisional coordinates Pn+1 can be generated in the relaxed travelable area 65 that is shifted towards the target location Pg by a prescribed distance of Xcm (or a prescribed time of Y seconds).

If the next provisional coordinates Pn+1 can be generated in the relaxed travelable area 65, then the traveling route calculation module 200 progresses to step S19, and if not, progresses to step S15. In step S15, it is determined that the traveling route calculation module 200 has failed to generate the traveling route and the process ends.

In step S19 executed after the determination of steps S13, S14, S17, and S18, the traveling route calculation module 200 calculates the next provisional coordinates Pn+1 and updates the endpoint of the traveling route with these provisional coordinates. That is, when going from step S13 to step S17, the traveling route calculation module 200 calculates the next provisional coordinates Pn+1 in the normal travelable area 60 that is shifted towards the target location Pg from the provisional coordinates Pn, which comprise the endpoint of the previous traveling route, by a prescribed distance of Xcm, and sets the next provisional coordinates as the endpoint of the traveling route.

Also, when going from step S14 to step S18, the traveling route calculation module 200 calculates the next provisional coordinates Pn+1 in the relaxed travelable area 65 that is shifted towards the target location Pg from the provisional coordinates Pn, which comprise the endpoint of the previous traveling route, by a prescribed distance of Xcm, and sets the next provisional coordinates as the endpoint of the traveling route.

In the above process, the provisional coordinates Pn+1, which were shifted by a prescribed distance of Xcm from the previously calculated provisional coordinates Pn towards the target location Pg, are generated on the travelable area (normal travelable area 60 or relaxed travelable area 65).

By repeatedly executing the process shown in FIGS. 7 and 8 above at a prescribed timing, it is possible to control the autonomous vehicle 100 while avoiding obstacles on the road 50. The prescribed timing may be set such that the process of FIG. 7 is repeated every given time period or distance set in advance, such as a few seconds or a few meters.

Figure 10A:
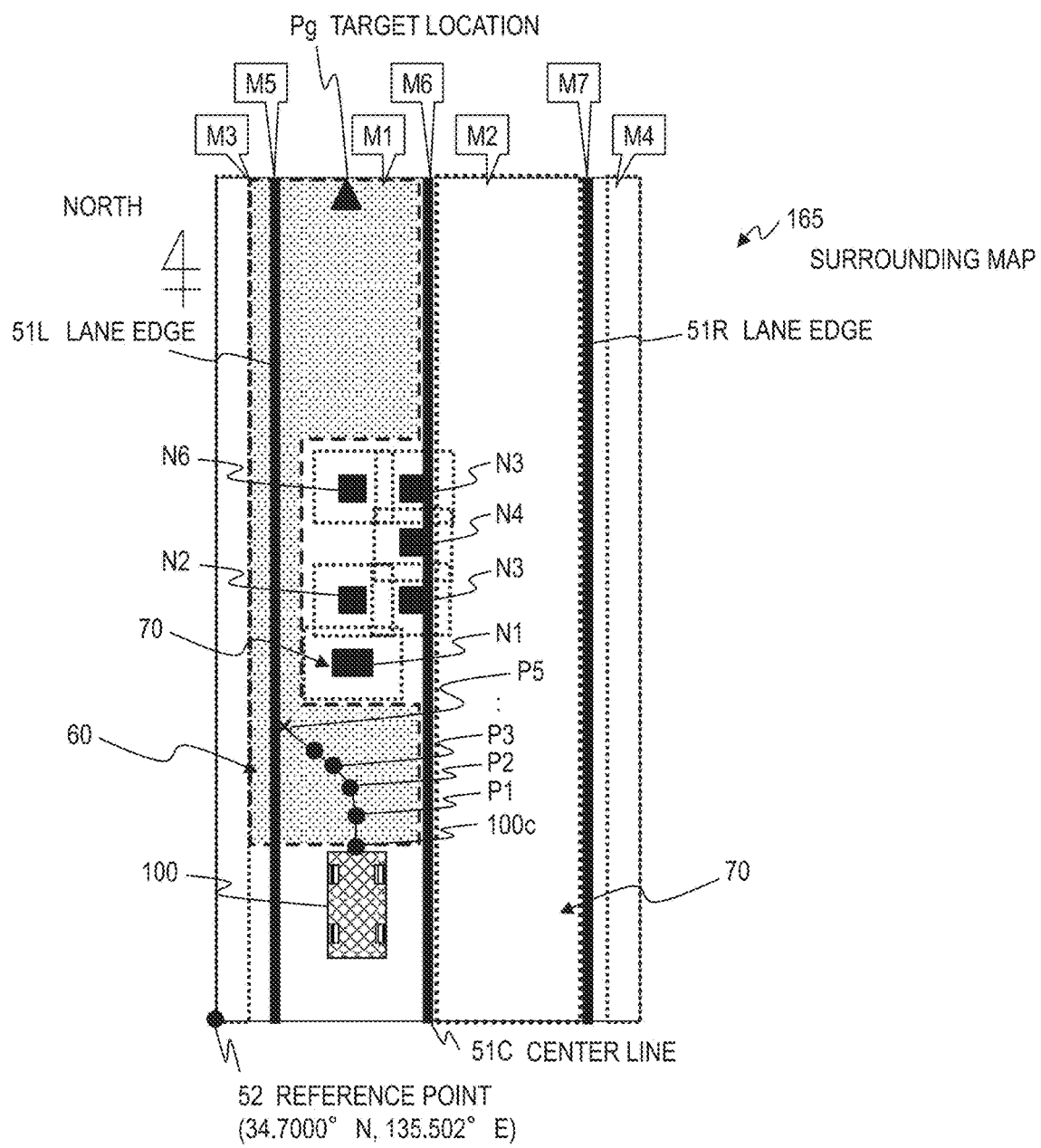
FIG. 10A is a map showing a traveling route calculated by the traveling route calculation module by applying the normal restrictions according to the first embodiment of this invention.

FIG. 10A is a map showing a traveling route calculated by the traveling route calculation module 200 by applying the normal restrictions. FIG. 10A shows the results of the traveling route calculation module 200 calculating the traveling route with only the normal restriction information in the traveling area shown in FIG. 9A.

As shown in FIG. 5B, in the normal traveling area restriction information 163 comprising the normal restriction information, the center line 51C (boundary line M6) is set to be uncrossable and the road M2, which is the oncoming lane, is set to be the traveling prohibition area 70, and thus, the traveling route calculation module 200 generates the provisional coordinates Pn towards the target location Pg from the side of the shoulder M3 in order to avoid the traveling prohibition area 70 due to construction, to set the traveling route.

However, after the provisional coordinates P5, the width of the normal travelable area 60 of the shoulder M3 is narrower than the width of the autonomous vehicle 100, and thus, the travel route calculation module 200 is unable to generate the provisional coordinates Pn+1 and fails to generate a route.

Figure 10B:
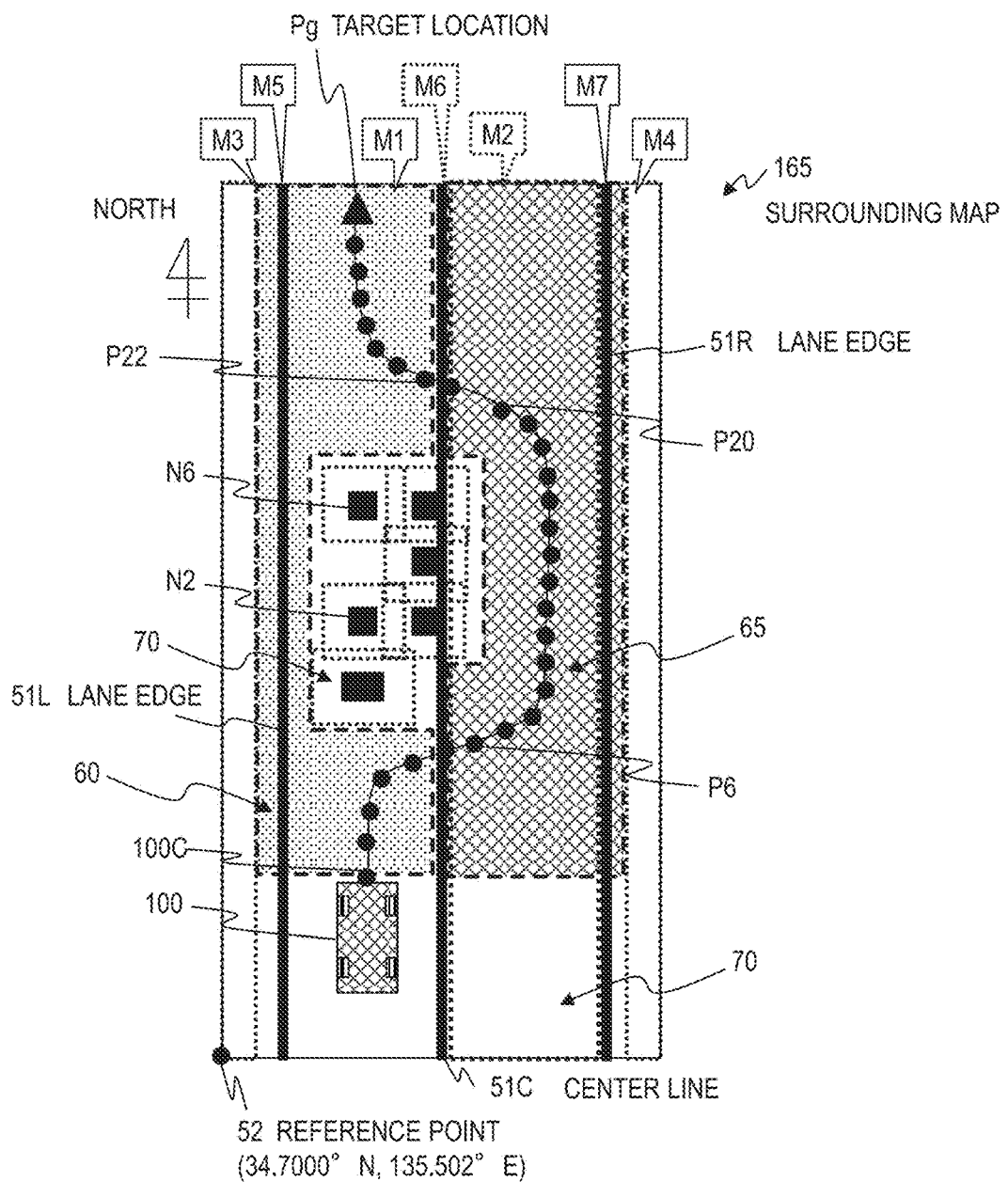
FIG. 10B is a map showing a traveling route calculated by the traveling route calculation module by applying the relaxed restrictions according to the first embodiment of this invention.

FIG. 10B is a map showing a travel route calculated by the traveling route calculation module 200 by applying the relaxed restrictions. FIG. 10B shows the results of the traveling route calculation module 200 calculating the traveling route by applying the relaxed restriction information to the normal restriction information in the traveling area shown in FIG. 9B.

As shown in FIG. 5C, in the relaxed traveling area restriction information 164 comprising the relaxed restriction information, the center line 51C (boundary line M6) is set to be crossable and the road M2, which is the oncoming lane, is set to be travelable, and thus, the traveling route calculation module 200 generates the provisional coordinates P6 to P20 towards the target location Pg from the road M2, which is the oncoming lane, in order to avoid the traveling prohibition area 70 due to construction, to set the traveling route.

After the provisional coordinates P20 of the oncoming lane, the normally travelable area 60 is travelable (steps S17, S19), and thus, after the provisional coordinates P22, the traveling route calculation module 200 sets a traveling route so as to cross the center line 51C and sets the provisional coordinates Pn to within the original normal travelable area 60 so as to reach the target location Pg.

As described above, by expanding the travelable area by applying the relaxed restriction information to the normal restriction information, it is possible to avoid obstacles on the road 50 and continue traveling.

In Embodiment 1, an example was shown in which the present invention is applied to a vehicle as an autonomous travel body, but the present invention can also be applied to ships and the like. When applied to ships, nautical chart information is used as the map information, and a shipping route is calculated instead of the traveling route.

Also, in Embodiment 1, an example was shown in which the sensor information integration module 210 detects objects to the front of the vehicle as object detection information 215, but the configuration is not limited thereto, and the sensor information integration module 210 may also detect environment information in the vicinity of the vehicle as non-map information. In the present embodiment, road conditions, weather, and the like can be added as non-map information in addition to the above-mentioned objects.

In Embodiment 1, an example was shown in which the relaxed restriction information was used to calculate the traveling route on the basis of the object detection information 215 to the front of the vehicle, but when the sensor information integration module 210 detects road conditions as the object detection information 215, the traveling route would be calculated with restriction information corresponding to road conditions being set. If the road 50 in front of the vehicle has collapsed or caved in and there is no travelable route with the normal restriction information, then the traveling route calculation module 200 can calculate a traveling route using restriction information corresponding to road conditions, for example.

Also, in Embodiment 1, an example was shown in which the GPS 104 was used as the position information detection device that detects the position information (coordinates) of the vehicle, but the Quasi-Zenith Satellite System or an inertial navigation system may be used.

Embodiment 2

FIGS. 11 to 14 show Embodiment 2 of the present invention. In Embodiment 2, when setting a temporary traveling prohibition area such as in a construction area or an accident location on a road 50, a traveling area relaxing information distribution apparatus 80 is installed, and issues a notification to the autonomous vehicle 100 of relaxed restrictions.

Figure 11:
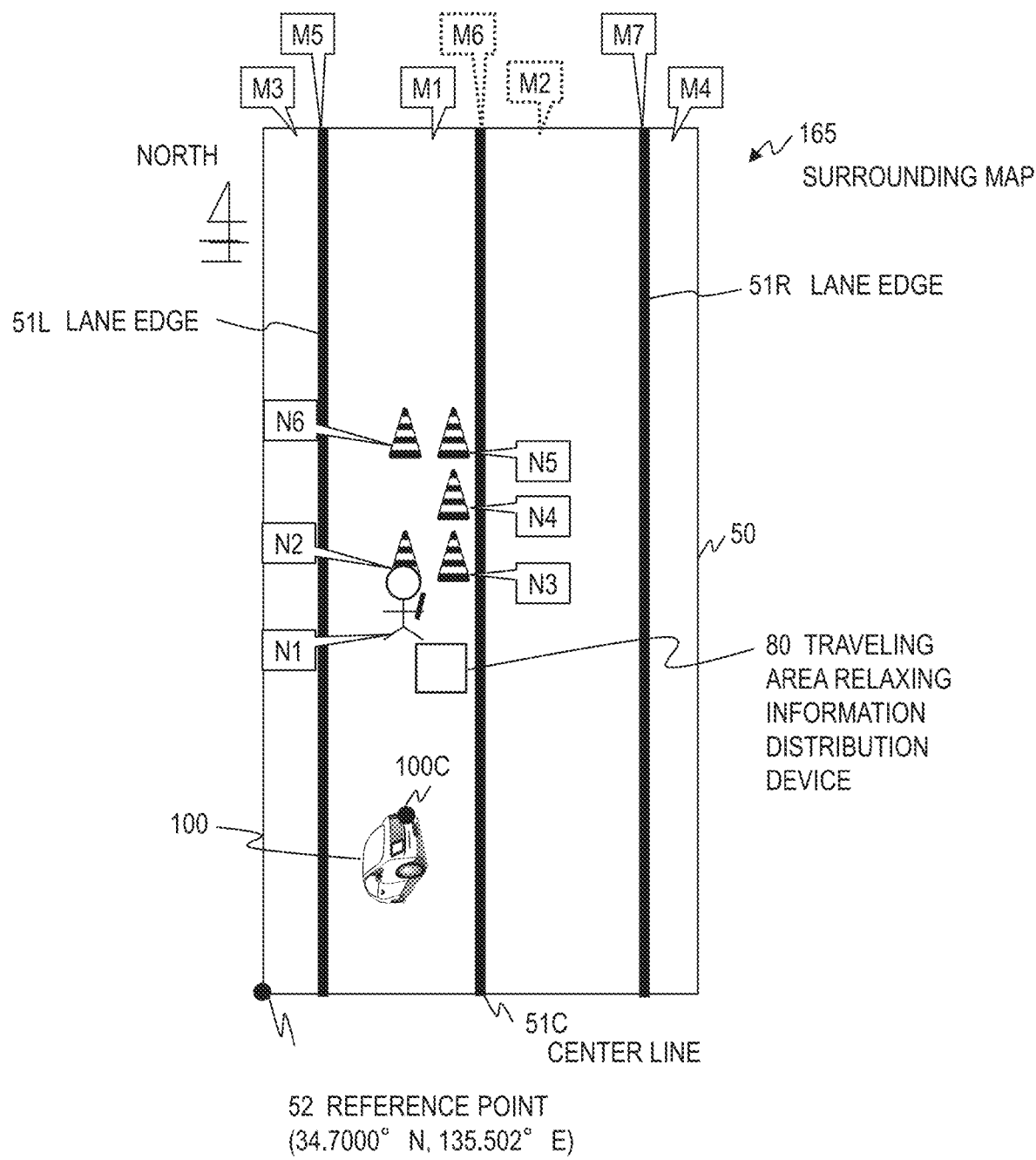
FIG. 11 is a surrounding map showing one example of the road 50 under construction according to a second embodiment of this invention.

FIG. 11 is a surrounding map 165 showing one example of the road 50 under construction. Similar to Embodiment 1, on the road 50 in front of the autonomous vehicle 100, the traveling area relaxing information distribution apparatus 80 is installed in addition to the construction area including objects such as a person N1 and cones N2 to N6, and information to relax traveling area restrictions (traveling area relaxing information) is provided by wireless communication.

Figure 12:
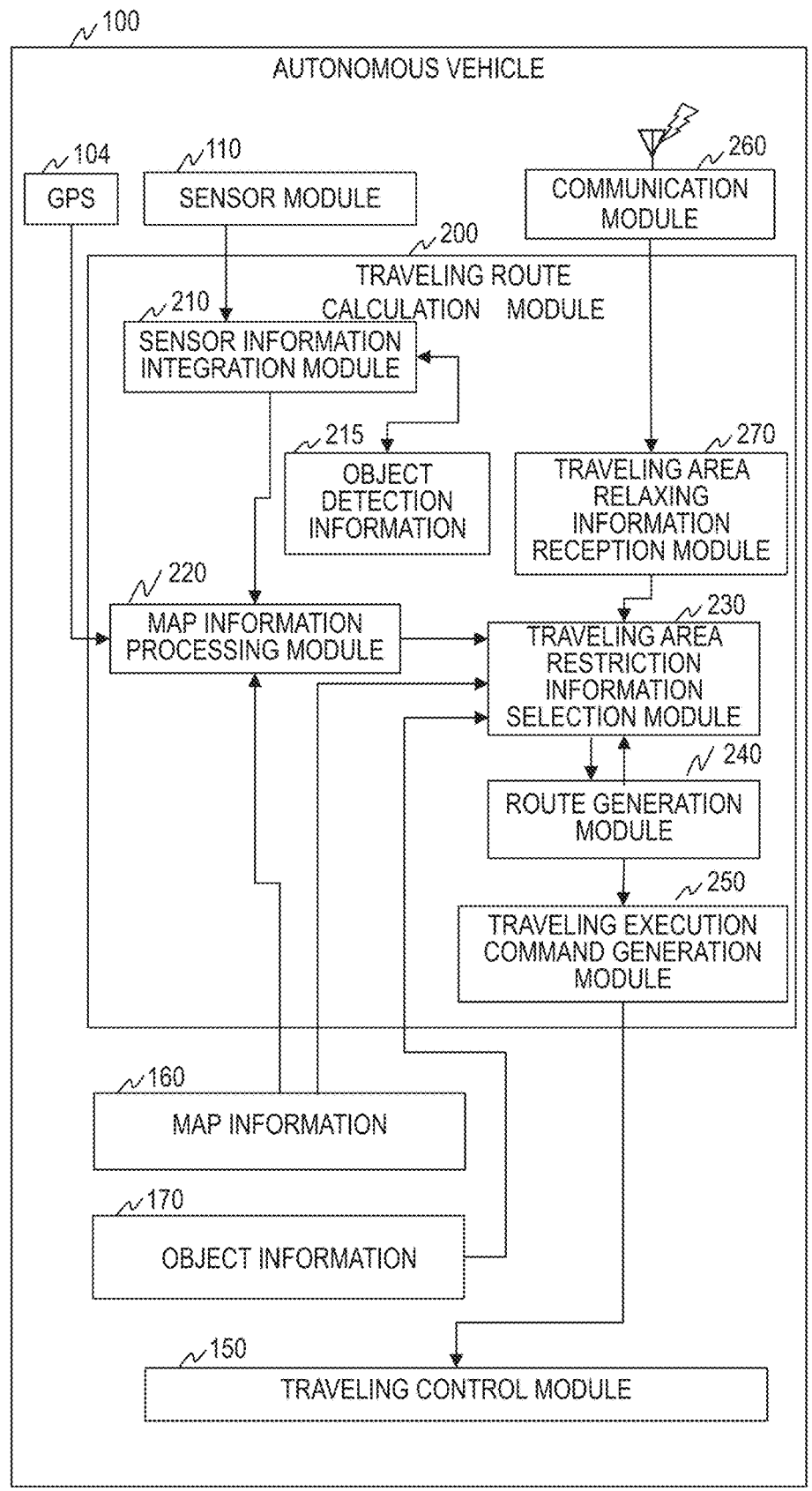
FIG. 12 is a block diagram showing an example of an autonomous vehicle according to the second embodiment of this invention.

FIG. 12 is a block diagram showing an example of an autonomous vehicle 100. The autonomous vehicle 100, in addition to the configuration of Embodiment 1, has a communication module 260 and a traveling area relaxing information reception module 270, but otherwise has a similar configuration to Embodiment 1.

The communication module 260 receives traveling area relaxing information through the traveling area relaxing information reception module 270 by performing wireless communication with the traveling area relaxing information distribution apparatus 80 on the road 50. The traveling area relaxing information reception module 270 outputs the traveling area relaxing information received from the traveling area relaxing information distribution apparatus 80 to a traveling area restriction information selection module 230.

If a traveling area relaxing information distribution apparatus 80 is present in the traveling area, the traveling area restriction information selection module 230 applies the received traveling area relaxing information to the normal traveling area restriction information 163 to generate the traveling route. The traveling route generation process will be described later.

Figure 13:
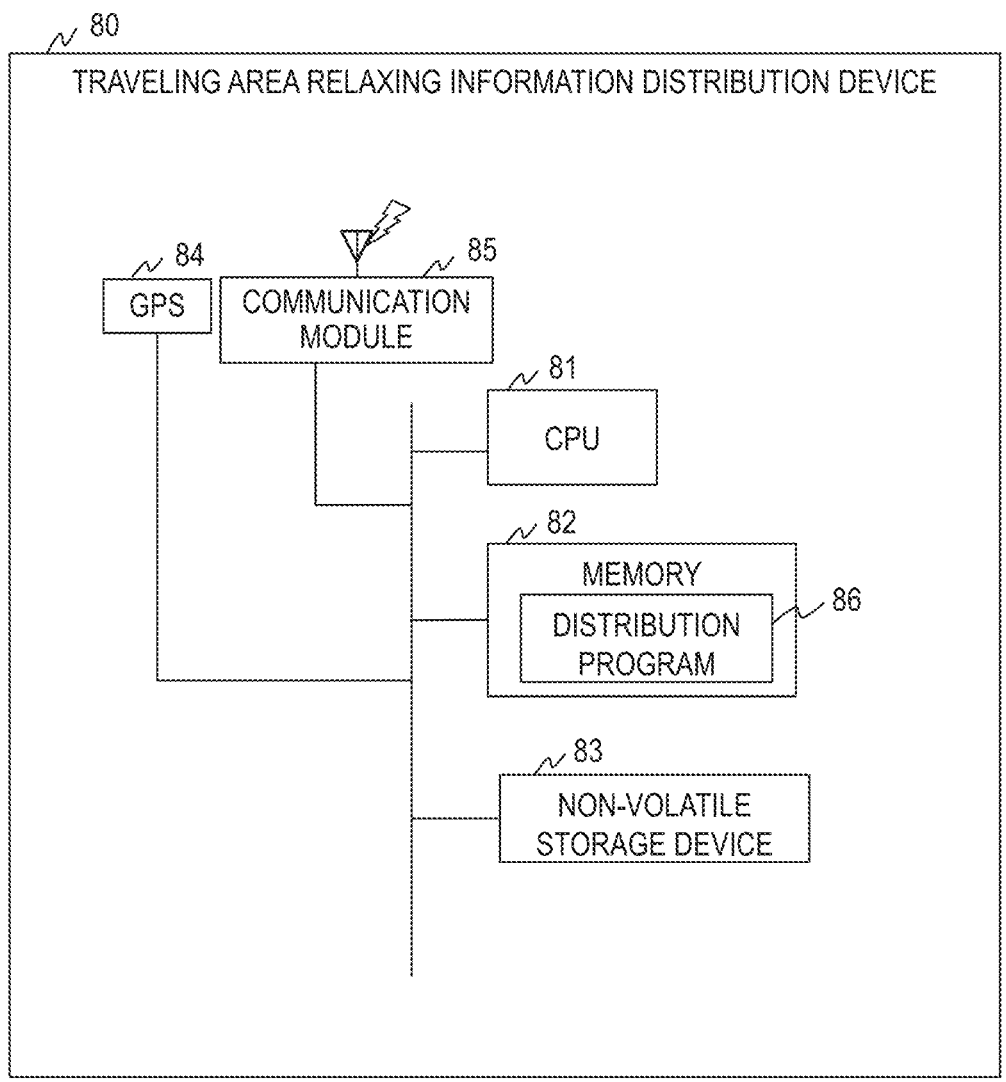
FIG. 13 is a block diagram showing an example of the traveling area relaxing information distribution apparatus according to the second embodiment of this invention.

FIG. 13 is a block diagram showing an example of the traveling area relaxing information distribution apparatus 80. The traveling area relaxing information distribution apparatus 80 includes a CPU 81 that performs operations, a memory 82 that stores programs and data, a non-volatile storage device 83 that stores programs and data, a GPS 84 that detects position information of the traveling area relaxing information distribution apparatus 80, and a communication module 85 that transmits the traveling area relaxing information to the autonomous vehicle 100.

A distribution program 86 is loaded to the memory 82 and executed by the CPU 81. The distribution program 86 transmits the position information of the traveling area relaxing information distribution apparatus 80 and the traveling area relaxing information for relaxing the normal restriction information at a prescribed interval. In the example of FIG. 11, the traveling area relaxing information includes information of an area where it is possible to cross the center line 51C (boundary line M6), where the travel direction of the road M2 is set such that travel is possible not only from north to south but additionally from south to north, and where restrictions are relaxed.

Figure 14:
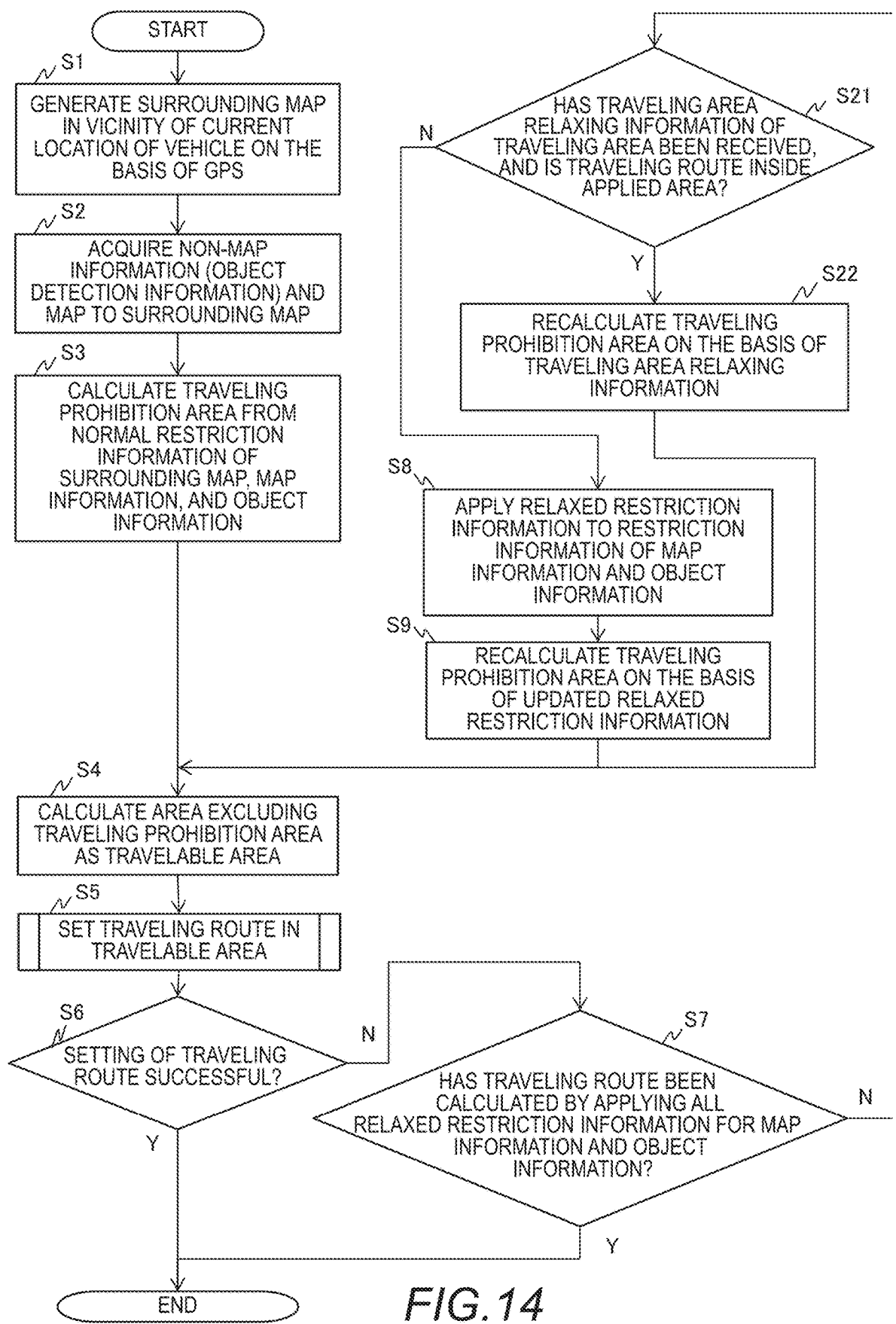
FIG. 14 is a flowchart showing an example of the process performed in the traveling route calculation module according to the second embodiment of this invention.

FIG. 14 is a flowchart showing an example of the process performed in the traveling route calculation module 200. The process of FIG. 14 has the process of steps S21 and S22 added to the process shown in FIG. 7 of Embodiment 1, and otherwise has a similar process to that of FIG. 7 of Embodiment 1.

In steps S7 to S9 where setting of the traveling route has failed due to obstacles or the like on the road 50, if not all of the relaxed restriction information is applied, the traveling route calculation module 200 proceeds to step S21 and the traveling area relaxing information reception module 270 receives the traveling area relaxing information in the traveling area of the vehicle and determines whether the traveling route is in an area where the traveling area relaxing information has been applied.

In step S22, if the traveling area relaxing information in the traveling area of the vehicle is received and the traveling route is included in the area to which the traveling area relaxing information has been applied, the traveling route calculation module 200 applies the traveling area relaxing information to the normal traveling area restriction information 163 and recalculates the traveling prohibition area 70 in the traveling area.

By the above process, if the traveling area relaxing information distribution apparatus 80 is disposed in the traveling area, the traveling route calculation module 200 receives the traveling area relaxing information in advance, and when the vehicle enters an area where the traveling area relaxing information is applied, then a traveling route that avoids obstacles by applying the traveling area relaxing information to the normal traveling area restriction information 163 can be smoothly calculated.

According to Embodiment 2, the received traveling area relaxing information can be applied as is to the normal restriction information without selecting in stages the relaxed restriction information and applying the relaxed restriction information to the normal restriction information, and thus, it is possible to rapidly calculate a traveling route that avoids obstacles.

Embodiment 3

Figure 15:
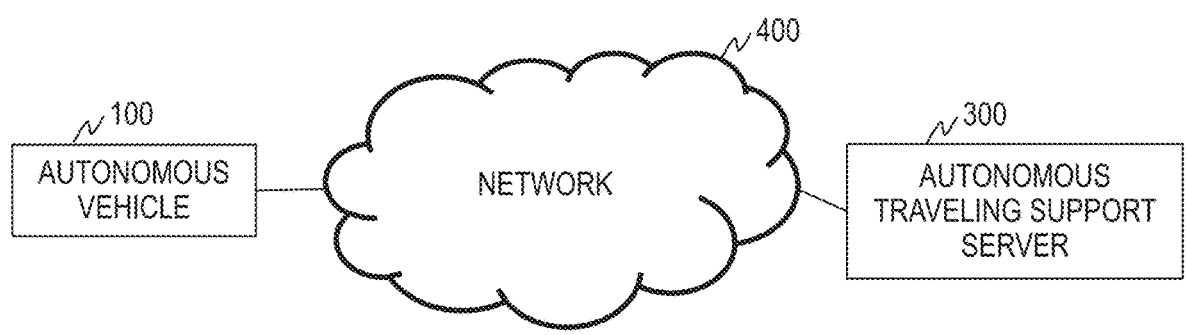
FIG. 15 is a block diagram showing an example of a computer system that manages an autonomous vehicle according to a third embodiment of this invention.
Figure 16:
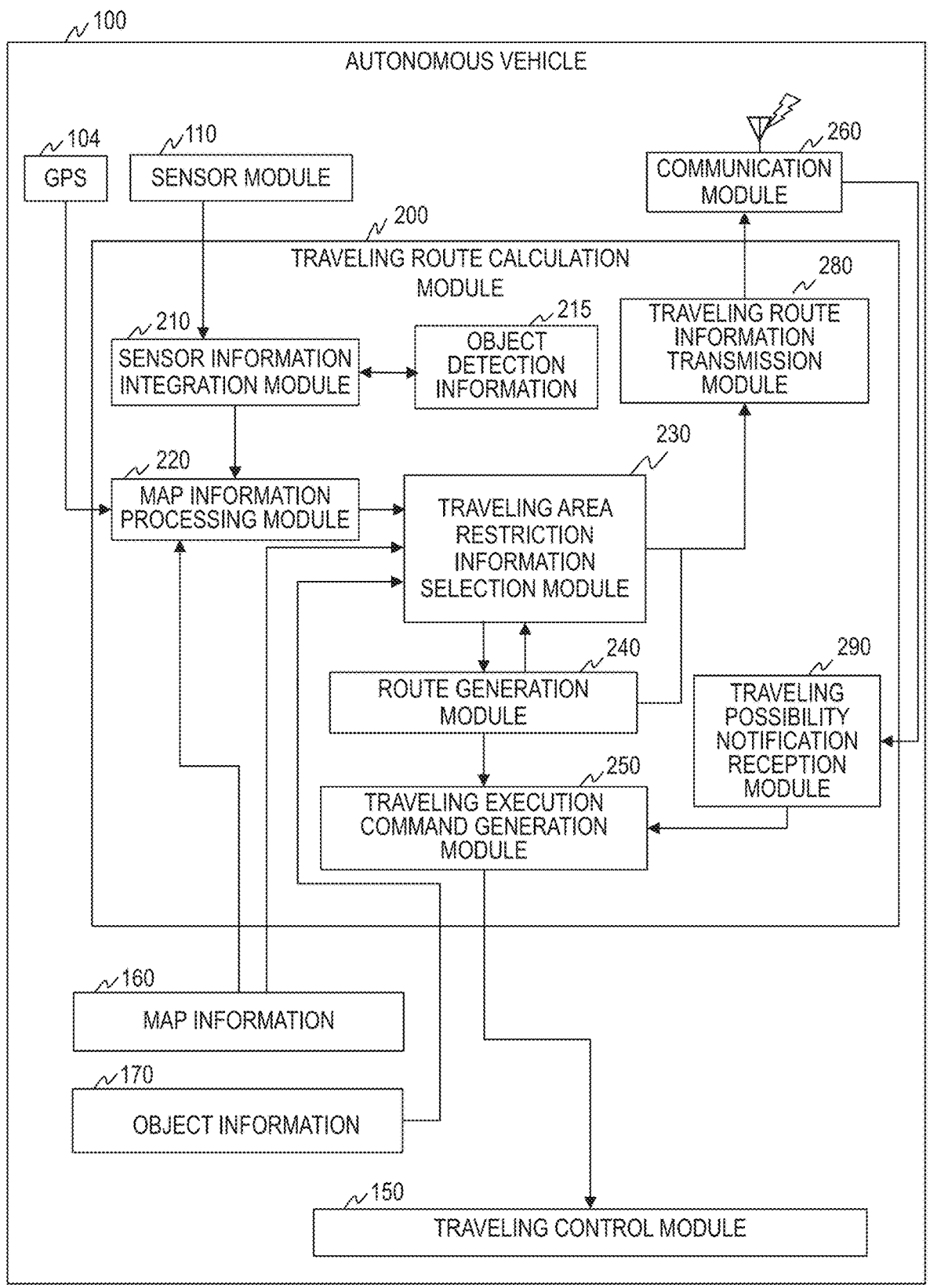
FIG. 16 is a block diagram showing an example of an autonomous vehicle according to the third embodiment of this invention.
Figure 17:
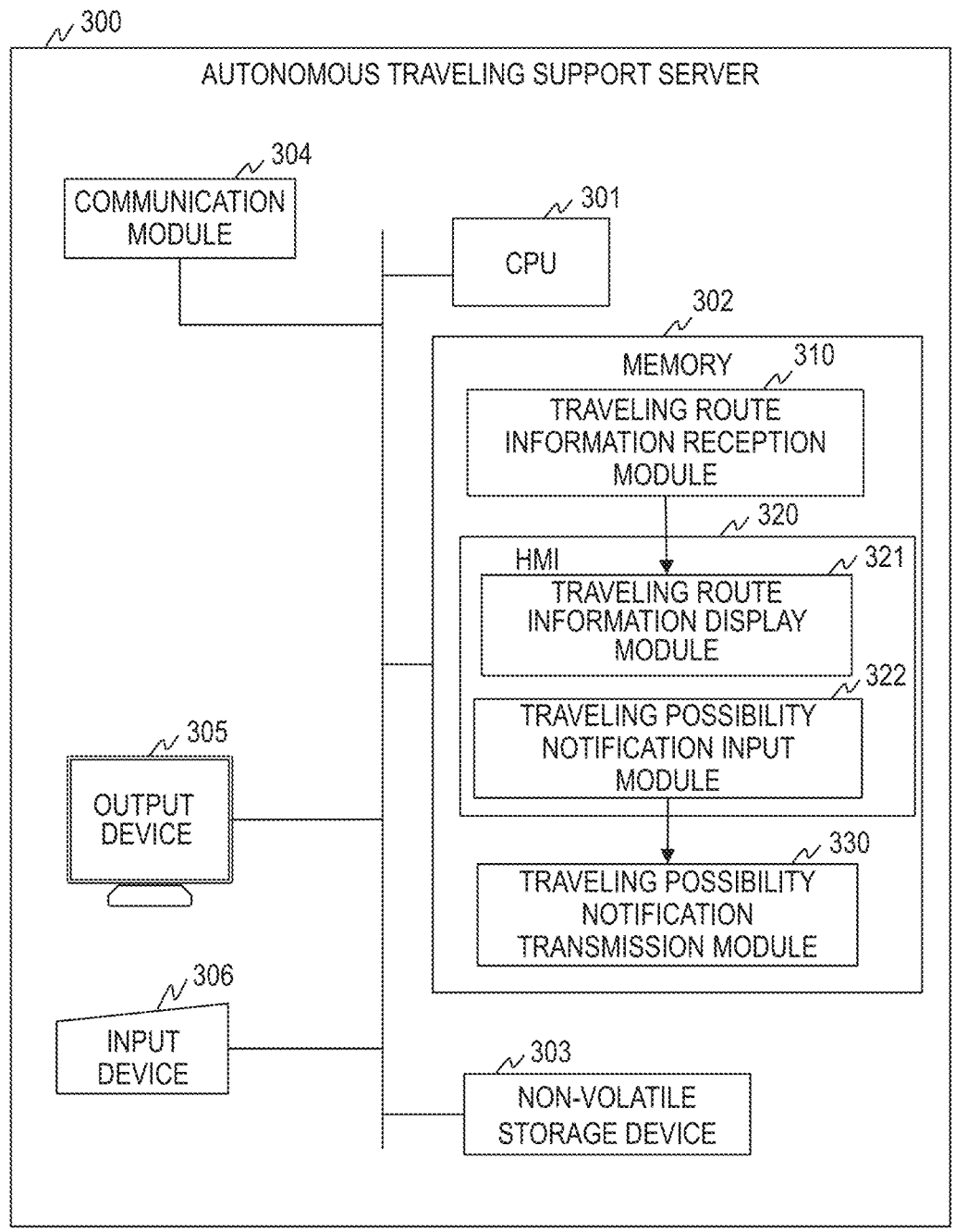
FIG. 17 is a block diagram showing an example of an autonomous traveling support server according to the third embodiment of this invention.

FIGS. 15 to 17 show Embodiment 3 of the present invention. FIG. 15 is a block diagram showing an example of a computer system that manages an autonomous vehicle 100. As shown in FIG. 15, Embodiment 3 indicates an example in which the autonomous vehicle 100 is connected to an autonomous traveling support server 300 through a network 400, and the traveling route calculated by the autonomous vehicle 100 is evaluated by the autonomous traveling support server 300.

FIG. 16 is a block diagram showing an example of an autonomous vehicle 100. The autonomous vehicle 100, in addition to the configuration of Embodiment 1, has a communication module 260, a traveling route information transmission module 280, and a traveling possibility notification reception module 290, but otherwise has a similar configuration to Embodiment 1.

The communication module 260 communicates with the autonomous traveling support server 300 through the network 400. The traveling route information transmission module 280 transmits to the autonomous traveling support server 300 a traveling route calculated by the route generation module 240 and relaxed restriction information selected by the traveling area restriction information selection module 230.

The traveling possibility notification reception module 290 executes travel by issuing the traveling route designated by the autonomous traveling support server 300 to the traveling execution command generation module 250.

In Embodiment 3, if the autonomous traveling support server 300 generates a traveling route using the relaxed restriction information, that is, when there is an obstacle on the road 50, the autonomous traveling support server 300 selects the traveling route and issues the traveling route to be executed to the autonomous vehicle 100. If, for example, a plurality of traveling routes have been calculated by the autonomous vehicle 100 to avoid an obstacle, the autonomous traveling support server 300 can determine an optimal traveling route.

In the autonomous vehicle 100 of Embodiment 3, one or more traveling routes are calculated by applying a plurality of pieces of relaxed restriction information, and are transmitted to the autonomous traveling support server 300. Thus, if the relaxed restriction information is used, then if the traveling route calculation module 200 succeeds in setting the traveling route according to the determination of step S6 shown in FIG. 7 of Embodiment 1, then the process is repeated until all relaxed restriction information is used.

FIG. 17 is a block diagram showing an example of an autonomous traveling support server 300. The autonomous traveling support server 300 is a computer that includes a CPU 301 that performs operations, a memory 302 that stores programs and data, a non-volatile storage device 303 that stores programs and data, a communication module 304 that communicates with the autonomous vehicle 100 through the network 400, an output device 305 that outputs operation results and the like, and an input device 306 that receives inputs from an operator.

The memory 302 includes a traveling route information reception module 310 that receives the traveling route transmitted by the autonomous vehicle 100 and relaxed restriction information, an interface 320 (human machine interface) that controls the input device 306 and the output device 305, and a traveling possibility notification transmission module 330 that transmits commands received from the input device 306.

The interface 320 includes a traveling route information display module 321 that displays in the output device 305 the traveling route and relaxed restriction information received from the autonomous vehicle 100, and a traveling possibility notification input module 322 that receives the traveling route issued by an operator of the autonomous traveling support server 300 through the input device 306.

The traveling route information reception module 310, the interface 320, and the traveling possibility notification transmission module 330 function as a command module that outputs commands to the autonomous vehicle 100.

In Embodiment 3, the traveling route generated from the autonomous vehicle 100 using relaxed restriction information is displayed in the output device 305. The operator of the autonomous traveling support server 300 selects one traveling route if there are a plurality of traveling routes and issues a command to execute the one traveling route. If there is only one traveling route, then the operator issues a command indicating whether travel is possible.

In Embodiment 3, when the autonomous vehicle 100 is to avoid an obstacle, the operator of the autonomous traveling support server 300 can select the traveling route and determine whether travel is possible. As a result, even if an unexpected obstacle were present, it is possible to control the autonomous vehicle 100.

The traveling route calculation module 200 may transmit to the autonomous traveling support server 300 a traveling route calculated by applying the relaxed restriction information to the normal restriction information and a determination request to determine whether the traveling route can be used, with the autonomous traveling support server 300 determining whether the traveling route can be used and issuing this determination to the autonomous vehicle 100. The traveling route calculation module 200 of the autonomous vehicle 100 receives information indicating whether the calculated traveling route can be used, and if the traveling route can be used, then the traveling route is outputted to the traveling control module 150.

Embodiment 3 indicates an example in which the present invention was applied to the autonomous vehicle 100, but the present invention may be applied to a semi-autonomous vehicle. A semi-autonomous vehicle is similar to the autonomous vehicle 100 if the normal restriction information is applied, but when the relaxed restriction information is used, the semi-autonomous vehicle issues an inquiry to the autonomous traveling support server 300 to select the traveling route and to determine whether travel is possible. The semi-autonomous vehicle travels on the basis of the response from the autonomous traveling support server 300.

Embodiment 4

Figure 18:
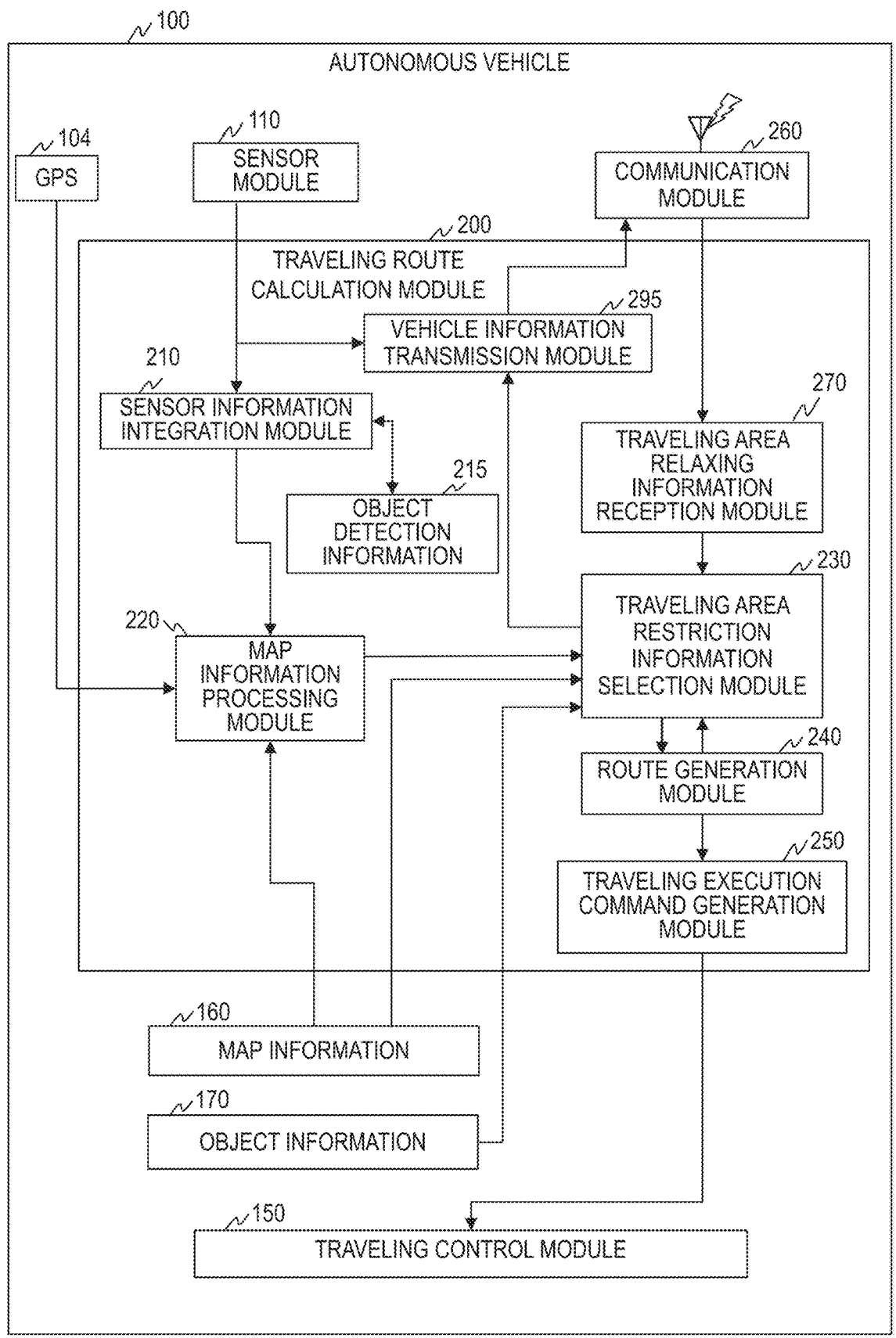
FIG. 18 is a block diagram showing an example of an autonomous vehicle according to a fourth embodiment of this invention.
Figure 19:
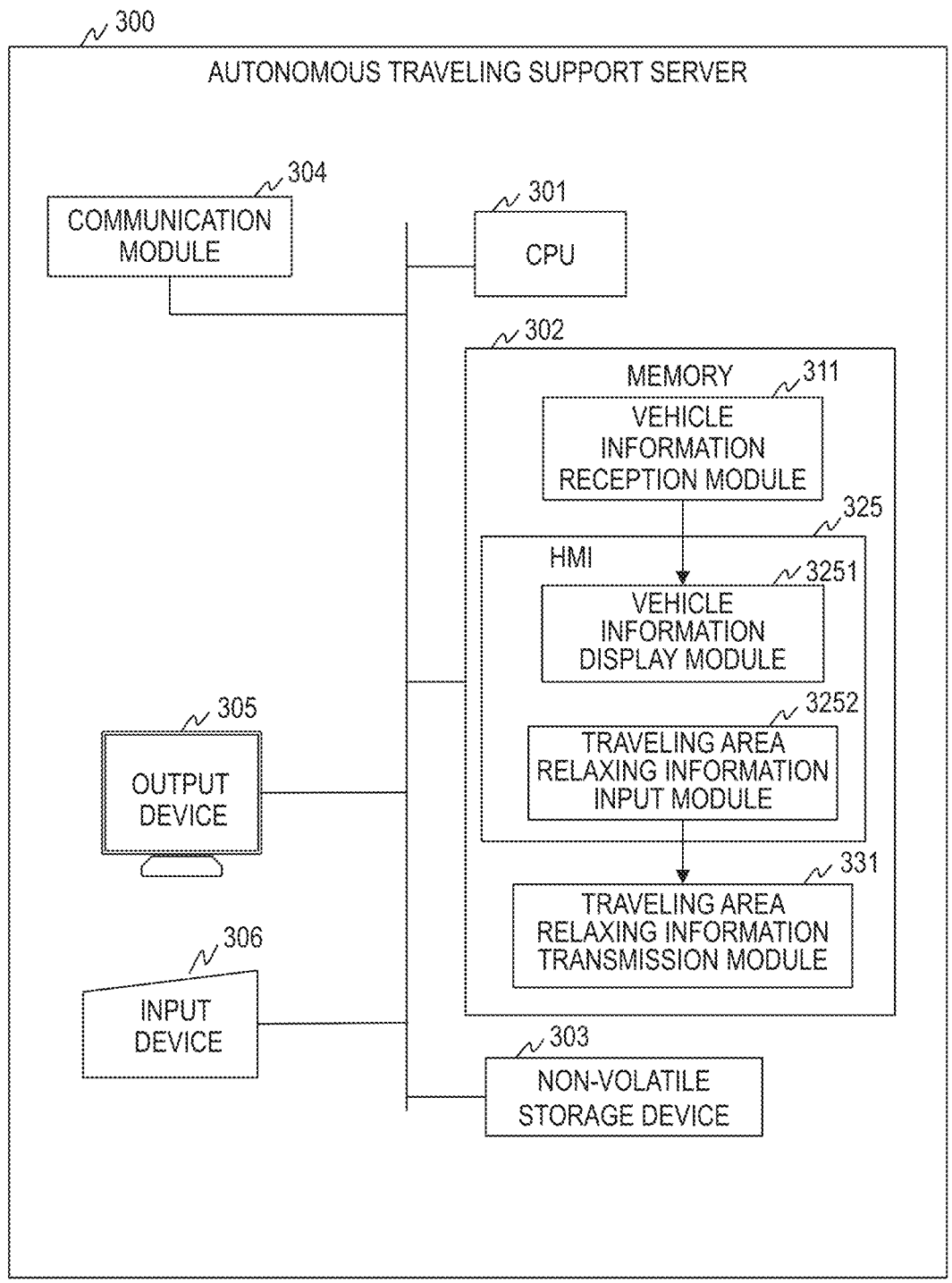
FIG. 19 is a block diagram showing an example of an autonomous traveling support server according to the fourth embodiment of this invention.

FIGS. 18 to 19 show Embodiment 4 of the present invention. An autonomous vehicle 100 of Embodiment 4 travels by calculating a traveling route using normal restriction information. If the autonomous vehicle 100 could not calculate a traveling route with normal restriction information, then similar to Embodiment 3, the autonomous vehicle receives relaxed restriction information from an autonomous traveling support server 300 connected thereto through a network 400 to calculate a traveling route and travels along that route.

FIG. 18 is a block diagram showing an example of an autonomous vehicle 100. The autonomous vehicle 100, in addition to the configuration of Embodiment 1, has a communication module 260, a traveling area relaxing information reception module 270, and a vehicle information transmission module 295, and omits the relaxed restriction information from the surrounding map 165 and the object information 170, but otherwise has a similar configuration to Embodiment 1.

Similar to Embodiment 3, the communication module 260 communicates with the autonomous traveling support server 300 through the network 400. If a traveling route cannot be calculated using normal restriction information, the vehicle information transmission module 295 transmits the surrounding map 165, normal restriction information, sensor information, and object detection information 215 to the autonomous traveling support server 300 and requests relaxed restriction information.

The traveling area relaxing information reception module 270 outputs the relaxed restriction information received from the autonomous traveling support server 300 to a traveling area restriction information selection module 230. The traveling area restriction information selection module 230 selects the received relaxed restriction information and the route generation module 240 generates a traveling route with the selected relaxed restriction information.

FIG. 19 is a block diagram showing an example of an autonomous traveling support server 300. Similar to Embodiment 3, the autonomous traveling support server 300 includes a CPU 301, a memory 302, a non-volatile storage device 303, a communication module 304, an output device 305, and an input device 306.

The memory 302 includes a vehicle information reception module 311 that receives vehicle information (surrounding map 165, normal restriction information, sensor information, and object detection information 215) transmitted by the autonomous vehicle 100, an interface 325 that controls the input device 306 and the output device 305, and a traveling area relaxing information transmission module 331 that transmits relaxed restriction information received from the input device 306.

The interface 325 includes a vehicle information display module 3251 that displays in the output device 305 the surrounding map 165, the normal restriction information, the sensor information, and the object detection information 215 received from the autonomous vehicle 100, and a traveling area relaxing information input module 3252 that receives the relaxed restriction information inputted or selected by an operator of the autonomous traveling support server 300 through the input device 306.

In Embodiment 4, the map information 160, normal restriction information, sensor information, and object detection information 215 transmitted from the autonomous vehicle 100 are displayed in the output device 305. The operator of the autonomous traveling support server 300 selects or inputs appropriate relaxed restriction information according to the vehicle information.

In Embodiment 4, when the autonomous vehicle 100 is to avoid an obstacle, the operator of the autonomous traveling support server 300 can select the relaxed restriction information. As a result, even if an unexpected obstacle were present, it is possible to control the autonomous vehicle 100.

The vehicle information reception module 311, the interface 325, and the traveling area relaxing information transmission module 331 function as a command module that outputs commands to the autonomous vehicle 100.

Embodiment 4 indicates an example in which the present invention was applied to the autonomous vehicle 100, but the present invention may be applied to a semi-autonomous vehicle such as described above.

Embodiment 5

Figure 20:
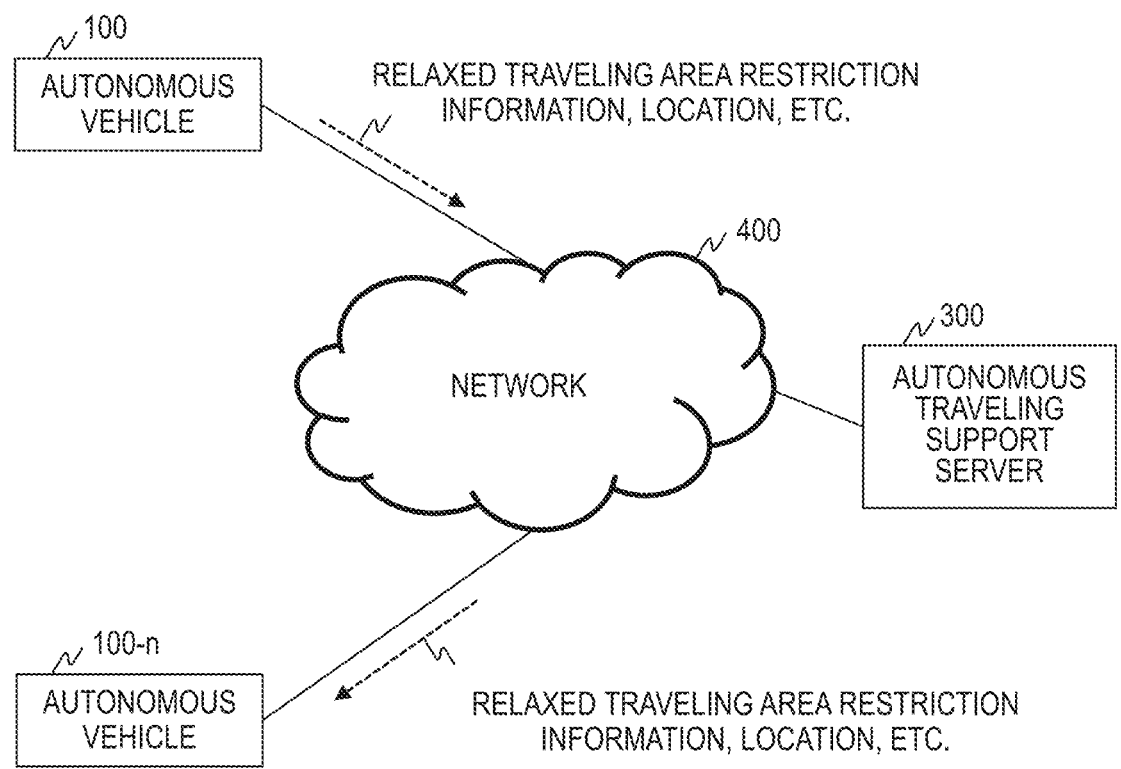
FIG. 20 is a block diagram showing an example of a computer system that manages autonomous vehicles according to a fifth embodiment of this invention.
Figure 21:
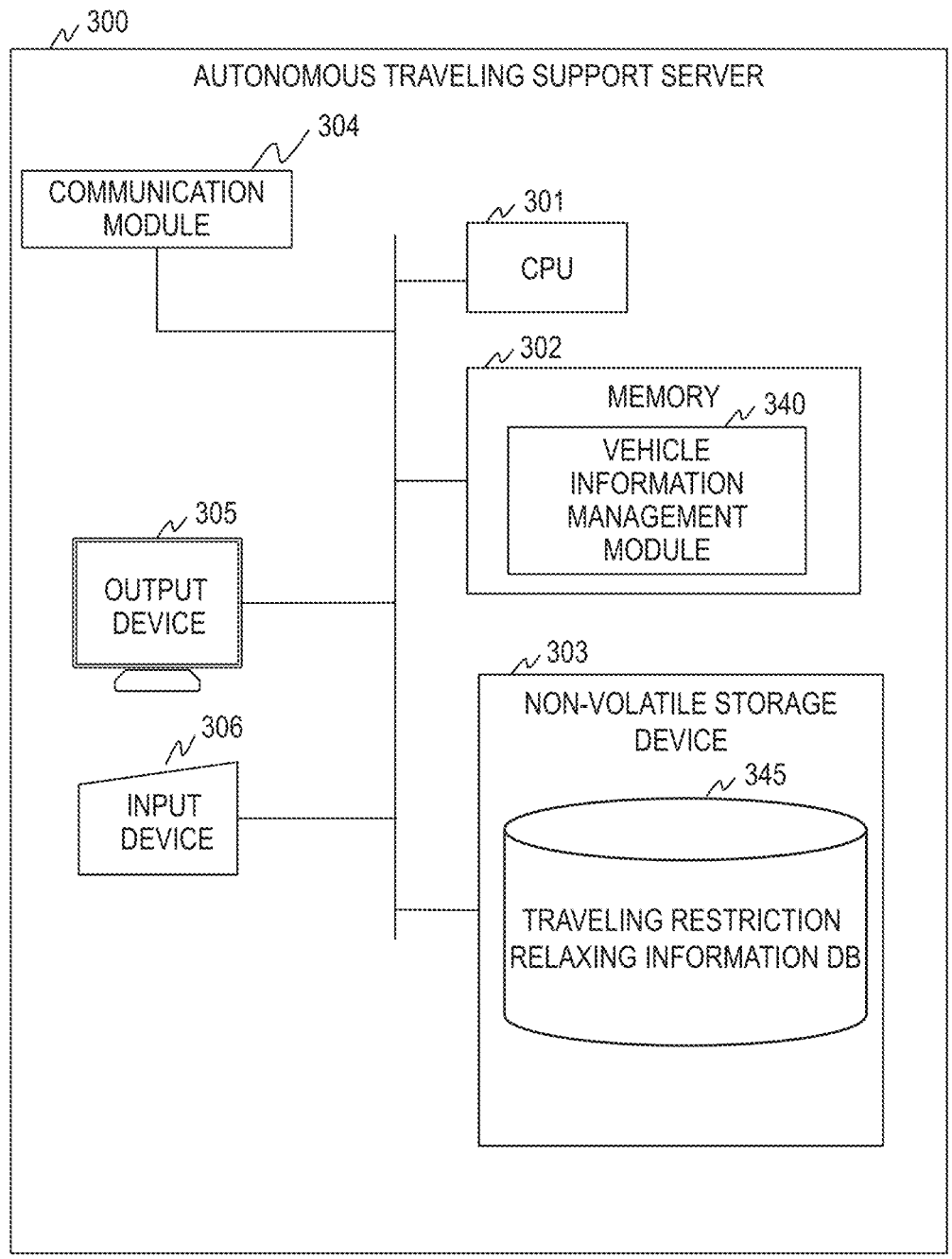
FIG. 21 is a block diagram showing an example of an autonomous traveling support server according to the fifth embodiment of this invention.

FIGS. 20 to 21 show Embodiment 5 of the present invention. FIG. 20 is a block diagram showing an example of a computer system that manages autonomous vehicles 100 and 100-n.

In Embodiment 5, if the autonomous vehicle 100 uses the relaxed restriction information to generate a traveling route, it transmits the used relaxed restriction information, the position information where the relaxed restriction information was used, and the traveling route to the autonomous traveling support server 300.

The autonomous traveling support server 300 transmits the relaxed restriction information used by the autonomous vehicle 100, the position information, and the traveling route to another autonomous vehicle 100-*n* that is planning to travel at a location where the autonomous vehicle 100 used the relaxed restriction information.

The other autonomous vehicle 100-*n* can set a traveling route using the traveling route of the autonomous vehicle 100 and the relaxed restriction information.

FIG. 21 is a block diagram showing an example of an autonomous traveling support server 300. Similar to Embodiment 3, the autonomous traveling support server 300 includes a CPU 301, a memory 302, a non-volatile storage device 303, a communication module 304, an output device 305, and an input device 306.

The memory 302 stores the relaxed restriction information, the traveling route, and the position information transmitted by the autonomous vehicle 100 in a traveling restriction relaxing information database 345 of the non-volatile storage device 303, and includes a vehicle information management module 340 that transmits the relaxed restriction information, the traveling route, and the position information to the other autonomous vehicle 100-*n*. The vehicle information management module 340 functions as a command module that outputs commands to the autonomous vehicle 100.

The position information includes coordinates (position information of the GPS 104) of the starting point where the relaxed restriction information started to be used and the ending point where use of the relaxed restriction information ended.

The autonomous vehicle 100, similar to Embodiment 4, has a vehicle information transmission module 295 and a traveling area relaxing information reception module 270. The traveling area relaxing information reception module 270 outputs the traveling route and position information received from the autonomous traveling support server 300 to the route generation module 240.

The autonomous vehicle 100-*n* issues a notification to the autonomous traveling support server 300 of the traveling area in which the vehicle is traveling at a prescribed timing (such as every time the traveling area changes). If relaxed restriction information is present in the same traveling area and has position information where the vehicle is to pass through, the vehicle information management module 340 of the autonomous traveling support server 300 reads the traveling route, the position information, and the relaxed restriction information of the autonomous vehicle 100 from the traveling restriction relaxing information database 345, and transmits the information to the autonomous vehicle 100-*n*.

According to Embodiment 5, by the autonomous traveling support server 300 managing traveling route information and the like of the autonomous vehicle 100 to avoid obstacles using the relaxed restriction information and providing this information to another autonomous vehicle 100-*n*, it is possible to reduce the calculation load of the other autonomous vehicle 100-*n*.

Embodiment 6

Figure 22:
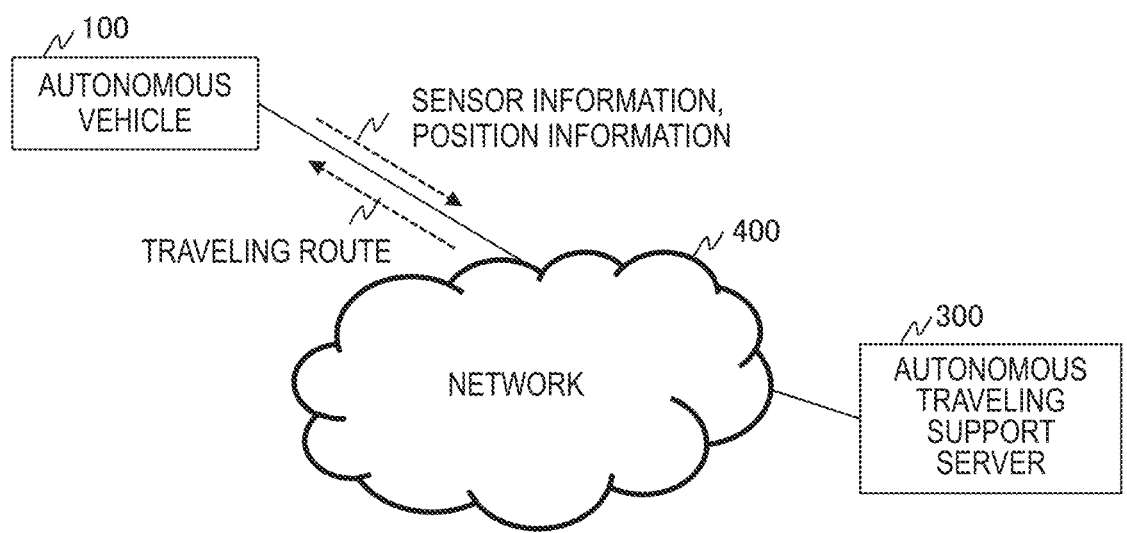
FIG. 22 is a block diagram showing an example of a computer system that manages an autonomous vehicle according to a sixth embodiment of this invention.

FIGS. 22 to 25 show Embodiment 6 of the present invention. FIG. 22 is a block diagram showing an example of a computer system that manages an autonomous vehicle 100.

In Embodiment 6, the autonomous vehicle 100 acquires sensor information and position information and transmits the information to the autonomous traveling support server 300. The autonomous traveling support server 300 calculates the traveling route by detecting objects from the received sensor information and position information, or the like, and transmits the traveling route to the autonomous vehicle 100. The autonomous vehicle 100 travels along the traveling route calculated by the autonomous traveling support server 300.

In other words, the functions of the traveling route calculation module 200 indicated in Embodiment 1 are instead performed by the autonomous traveling support server 300 in the present embodiment.

Figure 23:
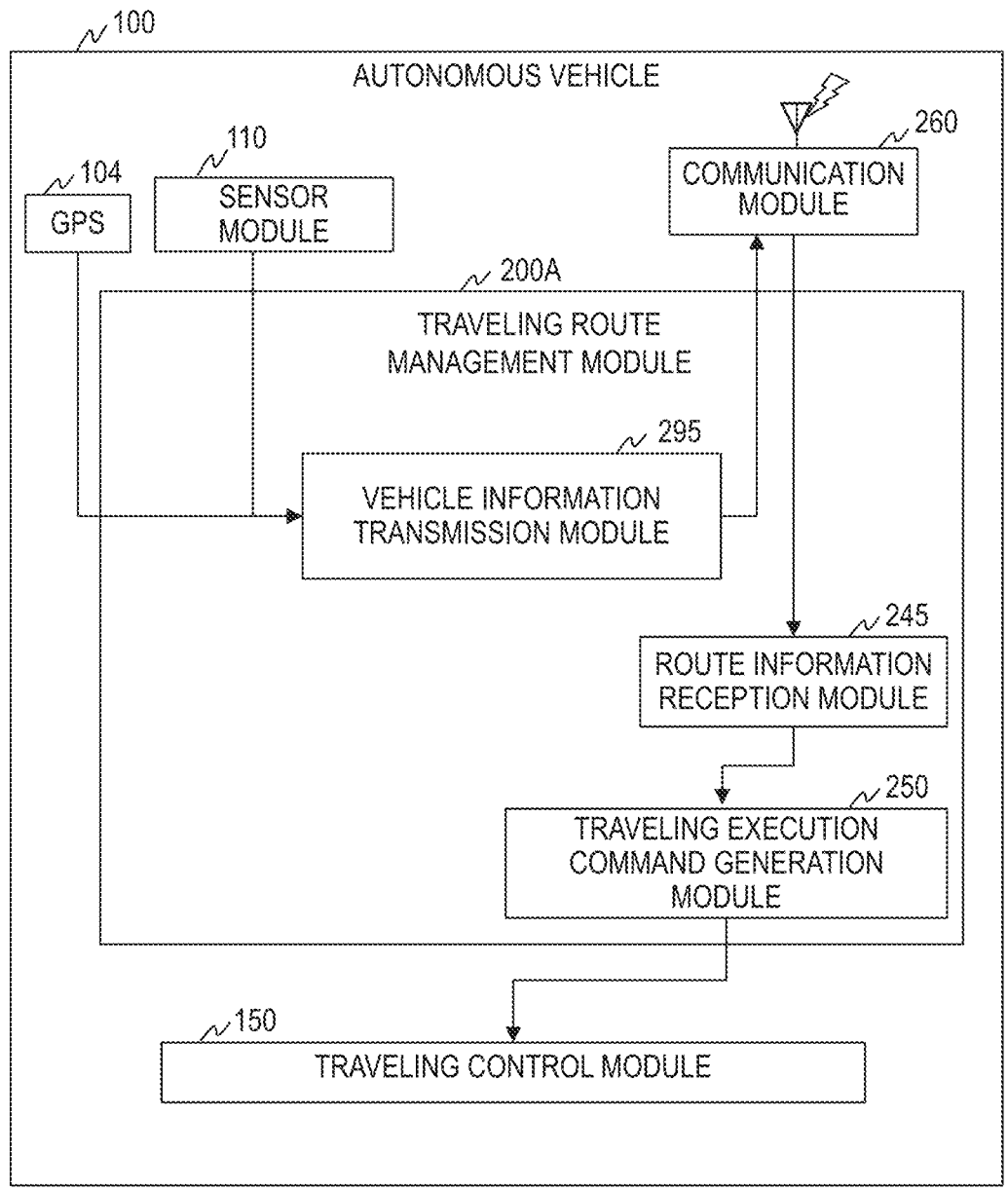
FIG. 23 is a block diagram showing an example of an autonomous vehicle according to the sixth embodiment of this invention.

FIG. 23 is a block diagram showing an example of an autonomous vehicle 100. In the autonomous vehicle 100 of Embodiment 6, the traveling route calculation module 200 of Embodiment 1 is replaced by a traveling route calculation module 200A, but the configuration of the autonomous vehicle is otherwise similar to that of Embodiment 1.

The traveling route calculation module 200A has a vehicle information transmission module 295 that transmits the position information from the GPS 104 and the sensor information detected by the sensor module 110 to the autonomous traveling support server 300 through the communication module 260, and a route information reception module 245 that receives the traveling route and target speed from the autonomous traveling support server 300 through the communication module 260 and outputs the traveling route and target speed to the traveling execution command generation module 250 (output unit).

After gathering the sensor information and position information, the autonomous vehicle 100 of Embodiment 6 causes the autonomous traveling support server 300 to calculate the traveling route, receives a traveling execution command corresponding to the resulting traveling route, and issues the command to the traveling control module 150.

Figure 24:
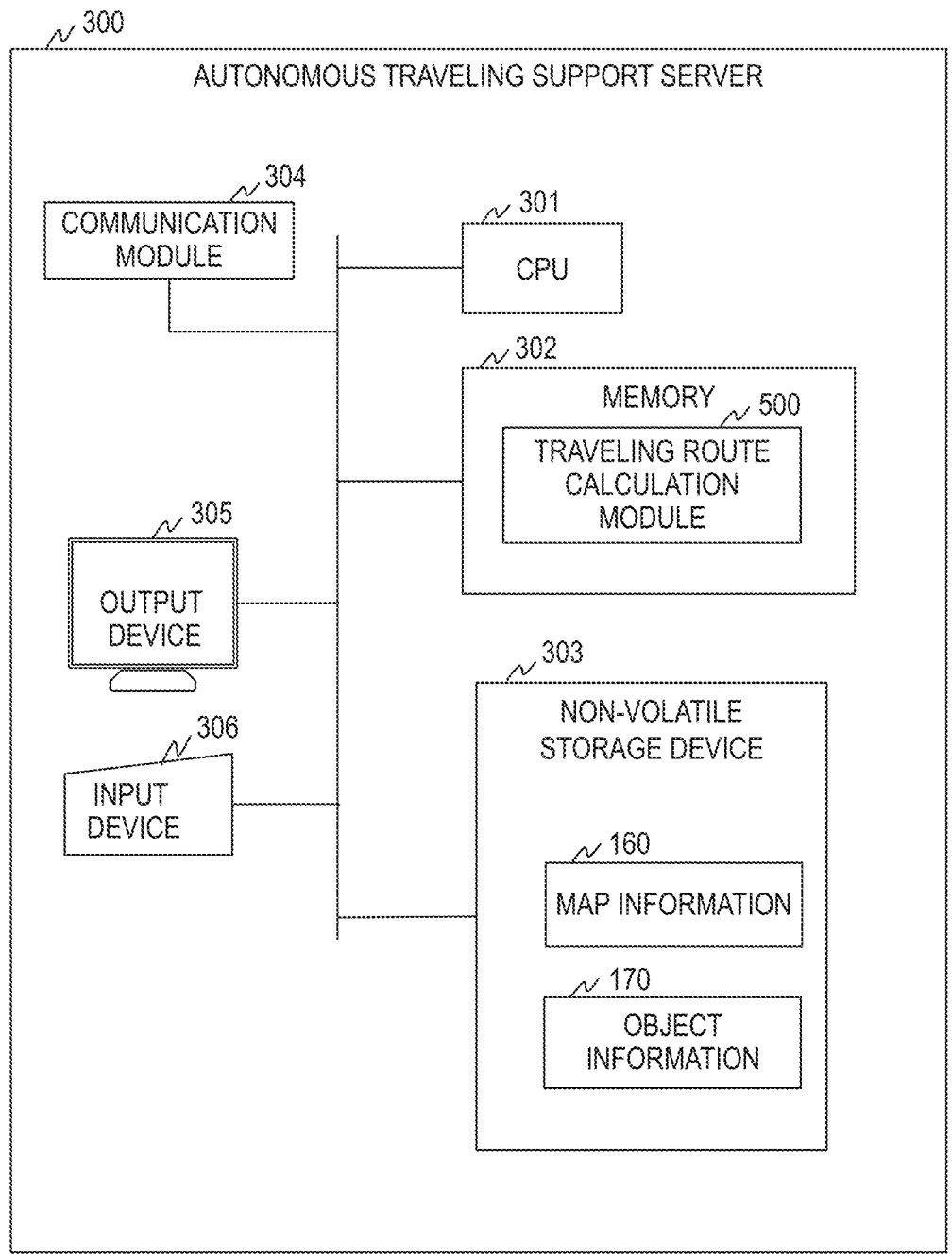
FIG. 24 is a block diagram showing an example of an autonomous traveling support server according to the sixth embodiment of this invention.

FIG. 24 is a block diagram showing an example of an autonomous traveling support server 300. Similar to Embodiment 3, the autonomous traveling support server 300 includes a CPU 301, a memory 302, a non-volatile storage device 303, a communication module 304, an output device 305, and an input device 306.

The memory 302 includes a traveling route calculation module 500 that calculates the traveling route from the sensor information and position information transmitted from the autonomous vehicle 100. Map information 160 and object information 170 similar to Embodiment 1 are stored in the non-volatile storage device 303.

Figure 25:
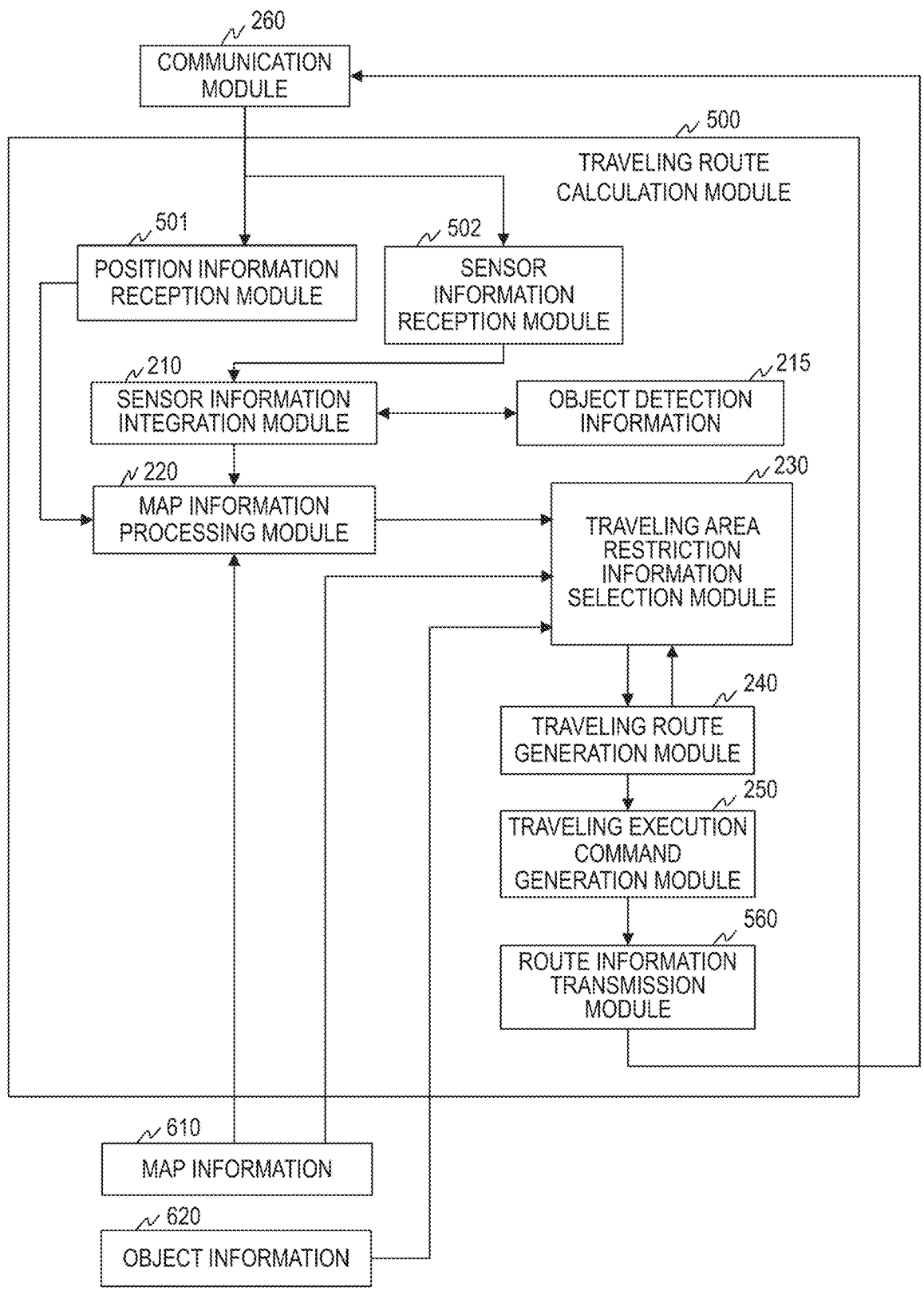
FIG. 25 is a block diagram showing an example of functional elements of the traveling route calculation module of the autonomous traveling support server according to the sixth embodiment of this invention.

FIG. 25 is a block diagram showing an example of functional elements of the traveling route calculation module 500 of the autonomous traveling support server 300.

The traveling route calculation module 500 has a position information reception module 501, a sensor information reception module 502, and a route information transmission module 560 added to the configuration of the traveling route calculation module 200 shown in FIG. 2 of Embodiment 1, and otherwise has a similar configuration to the traveling route calculation module 200 of Embodiment 1.

The position information reception module 501 extracts the position information of the autonomous vehicle 100 from the information received by the communication module 260 and outputs the position information to the map information processing module 220 to generate the surrounding map 165. The sensor information reception module 502 extracts the sensor information of the autonomous vehicle 100 from the information received by the communication module 260, outputs the sensor information to a sensor information integration module 210, and calculates the object detection information 215.

The traveling area restriction information selection module 230, the route generation module 240, and the traveling execution command generation module 250 function similar to those of Embodiment 1 and calculate the traveling route and generate a traveling execution command. The route information transmission module 560 transmits a traveling execution command calculated by the traveling route calculation module 500 to the autonomous vehicle 100.

In Embodiment 6, by preparing primary operation functions, the map information 160, and the object information 170 in the autonomous traveling support server 300, it is possible to minimize the hardware and software in the autonomous vehicle 100 and provide a low cost vehicle.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing modules, and processing means described above may be implemented by hardware by, for example, designing the components, the functions, and the like as an integrated circuit. The components, functions, and the like described above may also be implemented by software by a processor interpreting and executing programs that implement their respective functions. Pro grams, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that a re deemed necessary for the description of this invention, and not all of control lines and information lines of a product are mentioned. In actuality, it can be considered that almost all components are coupled to one another.

What is claimed is:

1. A moving body control method for a moving body including a processor, a memory, and a traveling control module, the method comprising:
a first step in which the moving body detects position information and generates a surrounding map of surroundings of the moving body from map information corresponding to the position information;
a second step in which the moving body acquires sensor information from a sensor indicating a surrounding environment and detects non-map information from the sensor information;
a third step in which the moving body determines whether the traveling route can be calculated by adding the non-map information to the surrounding map and applying to the surrounding map first restriction information in which restrictions in setting a traveling route are set in advance;
a fourth step in which, if the moving body can calculate the traveling route, the first restriction information is applied to the surrounding map to calculate the traveling route;
a fifth step in which, if the moving body cannot calculate the traveling route, second restriction information that relaxes restrictions in setting the traveling route is applied to the first restriction information to calculate the traveling route;
a sixth step in which the calculated traveling route is outputted to the traveling control module;
wherein the first restriction information has set in advance restriction information of the traveling route pertaining to elements in the surrounding map,
wherein the second restriction information has set in advance information for relaxing restrictions on the traveling route pertaining to elements in the surrounding map, and
wherein, in the fifth step, elements of the second restriction information are sequentially selected and applied to elements of the first restriction information to calculate the traveling route.

2. The moving body control method according to claim 1, wherein the first restriction information has set in advance restriction information of the traveling route pertaining to elements in the non-map information,
wherein the second restriction information has set in advance information for relaxing restrictions on the traveling route pertaining to elements in the non-map information.

3. The moving body control method according to claim 1, wherein the fifth step includes a step of receiving the second restriction information.

4. The moving body control method according to claim 1, wherein the fifth step includes:
a step of transmitting a request for the traveling route calculated by applying the second restriction information to the first restriction information, and for information indicating whether the traveling route can be used; and
a step of receiving the information indicating whether the traveling route can be used, and outputting the traveling route if the traveling route can be used.

5. The moving body control method according to claim 1, wherein the map information includes general information in which elements of the surrounding map are set in advance, normal restriction information among the first restriction information in which restriction information of the traveling route pertaining to the elements of the surrounding map is set in advance, and relaxed restriction information among the second restriction information that relaxes restrictions on the traveling route pertaining to the elements in the surrounding map.

6. A moving body, comprising:
a processor;
a memory;
a traveling control module;
a position information detection device that detects position information;
a sensor that acquires sensor information indicating a surrounding environment of the moving body;
a sensor information processing module that detects non-map information from the sensor information;
a map information processing module that generates a surrounding map of the moving body from map information corresponding to the position information, and adds the non-map information to the surrounding map; and a traveling route calculation module that applies to the surrounding map first restriction information in which restrictions in setting a traveling route are set in advance, calculates the traveling route, and outputs the traveling route to the traveling control module, wherein the first restriction information has set in advance restriction information of the traveling route pertaining to elements in the surrounding map, wherein the second restriction information has set in advance information for relaxing restrictions on the traveling route pertaining to elements in the surrounding map, wherein the traveling route calculation module determines whether the traveling route can be calculated by applying the first restriction information to the surrounding map, applies the first restriction information to the surrounding map to calculate the traveling route if the traveling route can be calculated, applies second restriction information that relaxes restrictions in setting the traveling route to the first restriction information to calculate the traveling route, if the traveling route cannot be calculated, sequentially selects elements of the second restriction information and applies said elements to elements of the first restriction information to calculate the traveling route.

7. The moving body according to claim 6,
wherein the first restriction information has set in advance restriction information of the traveling route pertaining to elements in the non-map information,
wherein the second restriction information has set in advance information for relaxing restrictions on the traveling route pertaining to elements in the non-map information, and
wherein the traveling route calculation module sequentially selects elements of the second restriction information and applies said elements to elements of the first restriction information to calculate the traveling route.

8. The moving body according to claim 6,
wherein the traveling route calculation module receives the second restriction information.

9. The moving body according to claim 6,
wherein the traveling route calculation module
transmits a request for the traveling route calculated by applying the second restriction information to the first restriction information, and for information indicating whether the traveling route can be used, and
receives the information indicating whether the traveling route can be used, and outputs the traveling route if the traveling route can be used.

10. The moving body according to claim 6,
wherein the map information includes general information in which elements of the surrounding map are set in advance, normal restriction information among the first restriction information in which restriction information of the traveling route pertaining to the elements of the surrounding map is set in advance, and relaxed restriction information among the second restriction information that relaxes restrictions on the traveling route pertaining to the elements in the surrounding map.

11. A moving body control system, comprising:
a moving body including a processor, a memory, and a traveling control module; and
a support server that has a processor and a memory and that is connected to the moving body through a network,
wherein the moving body has:
a position information detection device that detects position information;
a sensor that acquires sensor information indicating a surrounding environment of the moving body;
a sensor information processing module that detects non-map information from the sensor information;
a map information processing module that generates a surrounding map of the moving body from map information corresponding to the position information, and adds the non-map information to the surrounding map; and
a traveling route calculation module that determines whether a traveling route can be calculated by applying first restriction information, in which restrictions in setting the traveling route are set in advance, to the surrounding map, applies the first restriction information to the surrounding map to calculate the traveling route if the traveling route can be calculated, and, if the traveling route cannot be calculated by the first restriction information, requests a command from the support server, calculates the traveling route according to commands from the support server, and outputs the commands to the traveling control module, and
wherein the support server has a command module that receives the request from the moving body and outputs a command corresponding to the request,
wherein the traveling route calculation module calculates the traveling route by applying the first restriction information to the surrounding map, and, if the traveling route cannot be calculated, transmits to the support server the sensor information, the surrounding map, and the non-map information and requests a second restriction information,
wherein the command module of the support server selects the second restriction information in which information relaxing restriction on the traveling route relating to the elements of the surrounding map from the sensor information, the surrounding map, and the non-map information received from the moving body, and issues the second restriction information as a command to the moving body, and
wherein the traveling route calculation module sequentially selects elements of the second restriction information received from the support server and applies the elements to the elements of the first restriction information to calculate the travel route.

12. The moving body control system according to claim 11,
wherein the traveling route calculation module applies second restriction information that relaxes restrictions in setting the traveling route to the first restriction information to calculate the traveling route, and transmits to the support server the traveling route and a request to determine whether the traveling route can be used, if the traveling route cannot be calculated by applying the first restriction information to the surrounding map,
wherein the command module of the support server issues a command to the moving body indicating whether the traveling route received from the moving body can be used, and wherein the traveling route calculation module outputs the traveling route on the basis of the information received from the support server indicating whether the traveling route can be used.

13. The moving body control system according to claim 11,
wherein the traveling route calculation module applies second restriction information that relaxes restrictions in setting the traveling route to the first restriction information to calculate the traveling route, and transmits to the support server the traveling route, the position information of the moving body, and the second restriction information, if the traveling route cannot be calculated by applying the first restriction information to the surrounding map, and
wherein the command module of the support server stores the traveling route, the position information, and the second restriction information received from the moving body in a storage device, and transmits the traveling route, the position information, and the second restriction information to another moving body that is planning to travel according to the position information.

14. A moving body control system, comprising:
a moving body including a processor, a memory, and a traveling control module; and
a support server that has a processor and a memory and that is connected to the moving body through a network,
wherein the moving body has:
a position information detection device that detects position information;
a sensor that acquires sensor information indicating a surrounding environment of the moving body;
a vehicle information transmission module that transmits the position information and the sensor information to the support server; and
an output module that receives a traveling route from the support server and outputs the traveling route to the traveling control module, and
wherein the support server has:
a reception module that receives the position information and the sensor information from the moving body;
a sensor information processing module that detects non-map information from the sensor information;
a map information processing module that generates a surrounding map of the moving body from map information corresponding to the position information, and adds the non-map information to the surrounding map;
a first restriction information in which the restriction information of the traveling route related to the element of the surrounding map is set in advance;
a second restriction information in which information for relaxing the restriction of the traveling route related to the element of the surrounding map is set in advance; and
a traveling route calculation module that determines whether the traveling route can be calculated by applying the first restriction information in which restrictions in setting the traveling route are set in advance, applies the first restriction information to the surrounding map to calculate the traveling route if the traveling route can be calculated, sequentially selects elements of the second restriction information and applies second restriction information that relaxes restrictions in setting the traveling route to the elements of the first restriction information to calculate the traveling route and issues the traveling route as a command to the moving body if the traveling route cannot be calculated using the first restriction information.

* * * * *